(12) United States Patent
Takasu et al.

(10) Patent No.: US 7,514,065 B2
(45) Date of Patent: Apr. 7, 2009

(54) RUTHENIC ACID NANOSHEET AND PRODUCTION METHOD THEREOF

(75) Inventors: Yoshio Takasu, Ueda (JP); Yasushi Murakami, Ueda (JP); Wataru Sugimoto, 124-2, Nakanojo, Ueda-shi, Nagano 386-0034 (JP)

(73) Assignee: Wataru Sugimoto, Nagano (JP)

( * ) Notice: Subject to any disclaimer, the term of this patent is extended or adjusted under 35 U.S.C. 154(b) by 753 days.

(21) Appl. No.: 10/809,896

(22) Filed: Mar. 26, 2004

(65) Prior Publication Data
US 2004/0191160 A1    Sep. 30, 2004

(30) Foreign Application Priority Data
Mar. 28, 2003   (JP) .............................. 2003-092872

(51) Int. Cl.
| C01B 13/00 | (2006.01) |
| C01B 13/14 | (2006.01) |
| C01C 1/00  | (2006.01) |
| C01D 1/02  | (2006.01) |
| C01G 57/00 | (2006.01) |
| H01M 4/58  | (2006.01) |
| C09K 3/00  | (2006.01) |

(52) U.S. Cl. ............ 423/593.1; 423/592.1; 423/22; 429/231.1; 516/88; 977/755; 977/811

(58) Field of Classification Search ............ 423/593.1, 423/592.1, 246, 249, 22; 429/231.1; 427/123, 427/126.3; 516/88; 977/755, 811
See application file for complete search history.

(56) References Cited

U.S. PATENT DOCUMENTS

| 4,361,602 A * | 11/1982 | Torikai et al. ............... 427/123 |
| 5,897,913 A * | 4/1999  | Dessaux et al. ............. 427/96.2 |
| 2002/0028173 A1* | 3/2002 | Hibi et al. .................... 423/502 |

FOREIGN PATENT DOCUMENTS

JP          11-354389          12/1999

OTHER PUBLICATIONS

Y. Takasu, et al., "Design of Oxide Electrodes with Large Surface Area", Electrochimica Acta 45 (2000) 4135-4141.*
Sugimoto et al. "Preparation of Ruthenic Acid Nanosgheets and Utilization of Its Interlayer Surface for Electrochemical Energy Storage" Angewandte Chemie. vol. 115, Issue 34, pp. 4226-4230. Published online Sep. 5, 2003.*
Y. Takasu, et al., "Design of Oxide Electrodes with Large Surface Area", Electrochimica Acta 45 (2000) 4135-4141.

* cited by examiner

*Primary Examiner*—Steven Bos
*Assistant Examiner*—Anthony J Zimmer
(74) *Attorney, Agent, or Firm*—McDermott Will & Emery LLP

(57) ABSTRACT

A layered ruthenic acid compound is converted to a protonic layered ruthenic acid hydrate, which is then converted to a layered alkylammonium-ruthenic acid intercalation compound to obtain a colloid containing ruthenic acid nanosheets having a thickness of 1 nm or smaller. Thereby, a ruthenic acid nanosheet is obtained.

7 Claims, 16 Drawing Sheets

F I G. 1 4
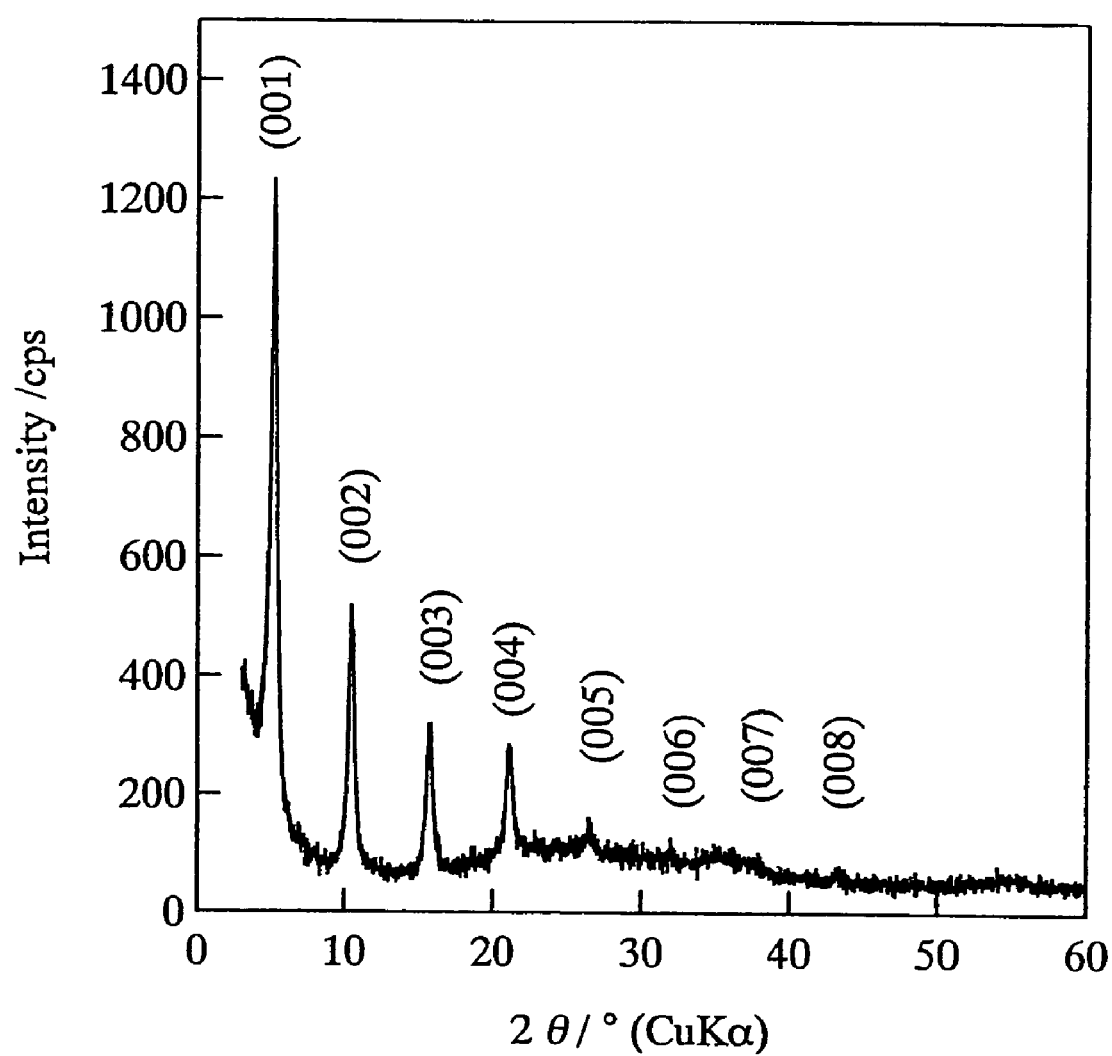

F I G. 1 6
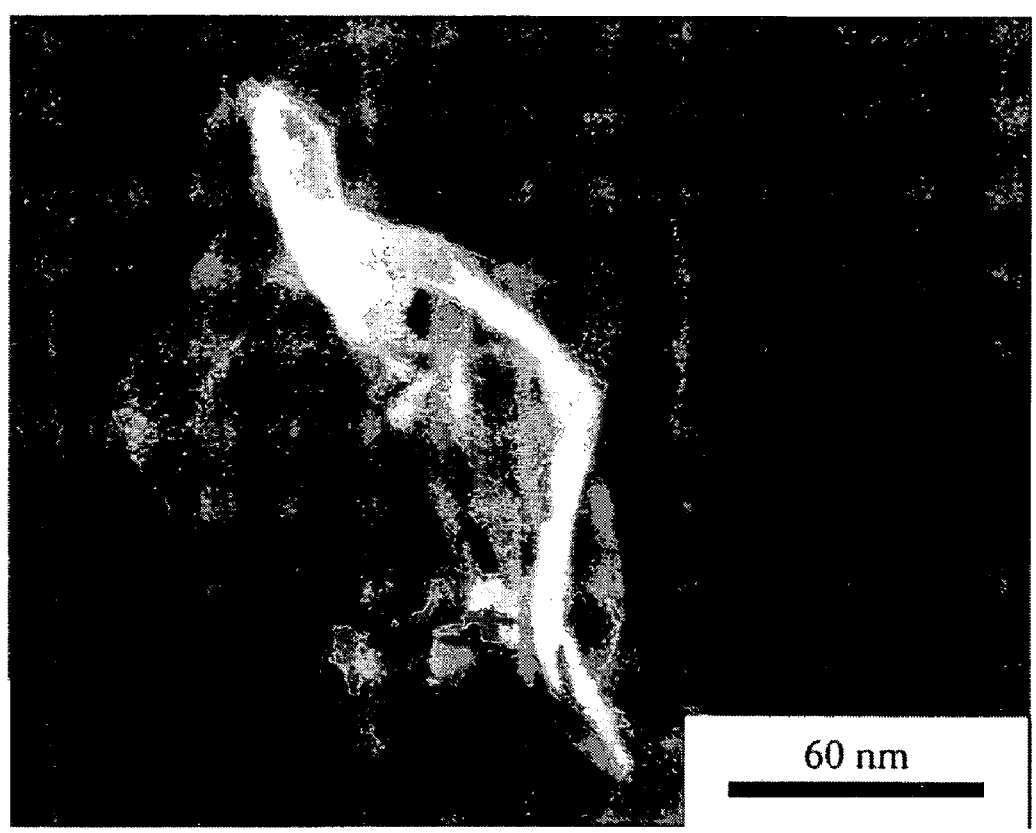

RUTHENIC ACID NANOSHEET AND PRODUCTION METHOD THEREOF

BACKGROUND OF THE INVENTION

The present invention relates to a ruthenic acid compound having a novel structure, a production method thereof and an electrochemical device using the ruthenic acid compound.

Electrical double-layer capacitors, pseudo electrical double-layer capacitors, secondary batteries and memory devices are typical examples of an electrochemical device having power storage capability. Depending on their characteristics, these devices have been applied to practical equipment. Due to its higher power density and longer life than the secondary battery, the electrical double-layer capacitor has been used in backup power sources requiring high reliability. The secondary battery, which is the most typical and classic power storage device, has higher energy density than the electrical double-layer capacitor. However, the secondary battery is shorter in life than the electrical double-layer capacitor and has to be replaced with a new one after a certain use period. On the other hand, the memory device has already been commercialized as a reusable timer, but development of a long-term timer running for 10 to 15 years has been waited for.

These power storage devices are different in characteristic due to their mechanisms for storing electric power. The pseudo electrical double-layer capacitor generates a capacitance by electrochemical adsorption at an interface between the surface of metal oxide such as $RuO_2$, $IrO_2$ or $Co_3O_4$ and an electrolyte. This capacitance is called pseudo-capacitance and distinguished from an electrical double-layer capacitance generated at an interface between the surface of an activated carbon electrode and an electrolyte.

The electrical double-layer capacitor does not cause an electrochemical reaction at the interface between the electrode and the electrolyte, but only brings about movement of ions contained in the electrolyte. Accordingly, the capacitor is not as easily deteriorated as the secondary battery, permitting long life and high power density due to the movement of ions at high speed.

On the other hand, the secondary battery is apt to deteriorate easily through charge/discharge because it utilizes the electrochemical reaction between the electrode and the electrolyte. The secondary battery causes the chemical reaction at a relatively low speed and has short battery life and relatively low power density. However, since the electrode material itself stores the energy in the form of chemical energy, the secondary battery shows higher energy density than the electrical double-layer capacitor that stores the energy only at the interface between the electrode and the electrolyte.

In view of these conventional power storage devices, there has been proposed a pseudo electrical double-layer capacitor having high power density and long life of the electrical double-layer capacitor and high energy density of the secondary battery. In general, ruthenium, iridium and cobalt are typical materials constituting an electrode of the pseudo electrical double-layer capacitor. However, since these materials are expensive, reduction in cost and increase in performance have been challenges to be solved.

As solutions to the challenges, there have been proposed an electrode dispersing rutile-type $RuO_2$ therein, an electrode material comprising a ruthenium compound and a vanadium compound adsorbed on activated carbon (Japanese Laid-Open Patent Publication No. HEI11-354389) and an electrode comprising a solid solution containing a ruthenium compound and a vanadium compound.

Further, a layered ruthenic acid compound has been proposed as a material for a pseudo electrical double-layer supercapacitor (Y. Takasu et al., Electrochim, Acta 2000, 45, 4135).

If a ruthenium compound, which is expensive, is supported on the surface of a host material such as activated carbon, the ruthenium compound will have a rutile-type or amorphous crystal structure. Accordingly, the initial voltage is expected to be high, but the ruthenium compound may come off the host material through repetitive charge/discharge for a long time.

Further, if a vanadium compound is added, bond strength to the host material decreases, causing dropping of the ruthenium compound through the long-term charge/discharge. Thus, a problem of battery life remains to be solved.

So far, a layered compound such as graphite has received attention as an electrode material. Typically used layered compounds are graphitizable carbon, $TiS_2$, $MoS_2$, $CoO_2$ and $V_6O_{13}$, whereas the synthesis of a layered ruthenium compound has been difficult.

The above-mentioned related document Y. Takasu et al., Electrochim, Acta 2000, 45, 4135 discloses a layered ruthenic acid compound. According to this document, the layered ruthenic acid compound is applied to a titanium metal current collector to form an electrode. However, the obtained electrode is not satisfactory due to lack of strength.

In view of the above, the present invention intends to provide a novel layered ruthenic acid compound having an increased active area and significantly improved charging capability.

In another aspect, the present invention intends to provide an electrode capable of realizing a high-powered large-capacitance electrochemical capacitor by using the layered ruthenic acid compound and an electrochemical device using the electrode.

BRIEF SUMMARY OF THE INVENTION

The present invention relates to a ruthenic acid nanosheet having a thickness of 1 nm or smaller. The ruthenic acid nanosheet is preferably represented by the formula (1):

$$[RuO_{2+0.5x}]^{x-} \qquad (1)$$

The present invention also relates to a layered ruthenic acid compound comprising a layered structure of the ruthenic acid nanosheets. The layered ruthenic acid compound preferably has an X-ray diffraction peak intensity at a (00L) plane (L=1 to n when $0 \leq \theta(CuK\alpha) \leq 90°$, n is determined depending on a basal interplanar spacing and $5 \leq n \leq 35$).

The present invention also relates to a colloidal ruthenic acid compound containing the ruthenic acid nanosheet and/or the layered ruthenic acid compound and a solvent.

Further, the present invention relates to alkali metal salt of the layered ruthenic acid compound (a layered alkaline metal-ruthenate compound), a protonic layered ruthenic acid compound obtained by exchanging at least part of alkali metal of the layered alkaline metal-ruthenate compound with proton, as well as hydrates thereof containing $H_2O$ molecules between layers of the layered ruthenic acid compounds.

In particular, a protonic layered ruthenic acid hydrate is represented by the formula (2):

$$M_{x-y}H_{y-z}B_zRuO_{2+0.5x} \cdot nH_2O \qquad (2)$$

[where M is an ion of alkali metal such as Li, Na, K, Rb or Cs, B is alkylammonium represented by $(R)_m NH_{4-m}$ or $(R)_{m-p}(R')_p NH_{4-m}$ (where R and R' are $CH_3(CH_2)_q$, respectively, m=0 to 4, p=0 to 3 and q=0 to 18), $0<x<1$, $0 \leq y<x$, $0 \leq z<y$ and $0 \leq n \leq 10$].

The present invention further provides a method of producing a ruthenic acid nanosheet comprising the steps of:

(a) mixing ruthenium oxide and an alkali metal compound and sintering or melting the resulting mixture to obtain a layered alkaline metal-ruthenate compound containing a ruthenic acid nanosheet having a thickness of 1 nm or smaller;

(b) treating the layered alkaline metal-ruthenate compound in an acidic solution to exchange at least part of alkali metal with proton to obtain a protonic layered ruthenic acid hydrate;

(c) reacting the protonic layered ruthenic acid hydrate with alkylammonium or alkylamine to obtain a layered alkylammonium-ruthenic acid intercalation compound; and (d) mixing the layered alkylammonium-ruthenic acid intercalation compound with a solvent to obtain a colloid containing a ruthenic acid nanosheet having a thickness of 1 nm or smaller.

In the step (a), it is preferable that ruthenium oxide and alkali metal salt are mixed and the resulting mixture is sintered at 700-900° C.

Further, in the step (a), it is also preferable that ruthenium oxide and alkali metal hydroxide are mixed and the resulting mixture is melted at 500-700° C.

In the step (c), it is preferable that the protonic layered ruthenic acid hydrate is reacted with alkylammonium represented by $(R)_m NH_{4-m}$ or $(R)_{m-p}(R')_p NH_{4-m}$ (where R and R' are $CH_3(CH_2)_q$, respectively, m=0 to 4, p=0 to 3 and q=0 to 18).

Further, in the step (c), it is also preferable that the protonic layered ruthenic acid hydrate is reacted with alkylamine represented by $(R)_m NH_{3-m}$ or $(R)_{m-p}(R')_p NH_{3-m}$ (where R and R' are $CH_3(CH_2)_q$, respectively, m=0 to 3, p=0 to 2 and q=0 to 18).

In the step (d), it is preferable that the layered alkylammonium-ruthenic acid intercalation compound is mixed with at least one solvent selected from the group consisting of water, alcohol, acetonitrile, dimethyl sulfoxide, dimethylformamide and propylene carbonate to obtain a colloid.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 14 is a powder X-ray diffraction pattern of a layered tetrabutylammonium-ruthenic acid intercalation compound of the present invention.

FIG. 16 is a scanning electron microscopic image of a ruthenic acid nanosheet of the present invention.

DETAILED DESCRIPTION OF THE INVENTION

Figure 1:
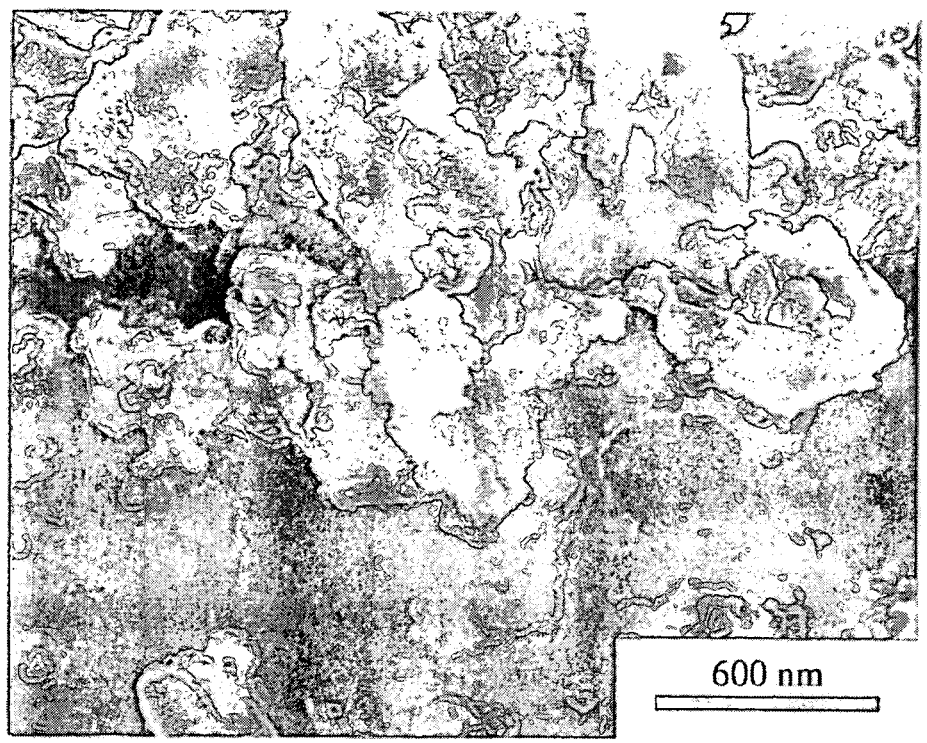
FIG. 1 is a scanning electron microscopic image of a layered potassium ruthenate of the present invention.

A layered ruthenic acid compound comprising a layered structure of ruthenic acid nanosheets of the present invention having a thickness of 1 nm or smaller exhibits charging capability superior to that of conventional ruthenium oxide. Accordingly, the compound is effectively used as an electrode of an electrochemical device. More specifically, in the layered ruthenic acid compound, the ruthenic acid nanosheets, which are electron conductive layers having electrochemical stability, are stacked with proton conductive layers comprising water or hydrated protons on the molecular level. Therefore, the layered ruthenic acid compound exhibits significantly increased charging capability and is applicable to a high-powered large-capacitance supercapacitor.

Further, the ruthenic acid nanosheet of the present invention having a thickness of 1 nm or smaller derived from the layered ruthenic acid compound also exhibits charging capability superior to that of conventional ruthenium oxide, and hence it is effectively used as a material for an electrode of an electrochemical device.

The inventors of the present invention have found that adding potassium salt to a ruthenic compound allows synthesis of a layered compound comprising a stacked structure of layers having a thickness of 1 nm or smaller (layered ruthenic acid compound). Further, they have succeeded in making the layered ruthenic acid compound into fine particles (an increase in area). Thereby, the ruthenic acid nanosheet having a thickness of 1 nm or smaller is obtained. The ruthenic acid nanosheet mentioned herein signifies a crystalline ruthenic acid compound in a sheet form having a thickness in the nanometer order and length and width in the micrometer order. The ruthenic acid nanosheet can be used in a pseudo electrical double-layer capacitor. If proton conductivity is given thereto, the capacity of the pseudo electrical double-layer capacitor become ten times larger than that of a conventional one.

As a result of synthesis of the layered ruthenic acid compound having a crystal structure in which crystalline layers and water layers are stacked on the nanometer level, there has been allowed easy movement of protons in a solid bulk of the layered ruthenic acid compound. Thus, the present invention has been achieved. As described above, the layered ruthenic acid compound of the present invention includes electron conductive layers comprising sheet-like ruthenium oxide crystals of the nanometer level having electrochemical stability and proton conductive layers comprising water or hydrated proton. Owing to the layered structure of the electron conductive layers and the proton conductive layers on the molecular level, the layered ruthenic acid compound exhibits significantly improved charging capability. That is, the layered ruthenic acid compound is a useful material for a high-powered large-capacitance supercapacitor.

The layered ruthenic acid compound of the present invention has an X-ray diffraction peak intensity at a (00L) plane (L=1 to n when $0 \leq \theta(CuK\alpha) \leq 90°$, n is determined depending on a basal interplanar spacing and $5 \leq n \leq 35$). In particular, the layered ruthenic acid compound has higher diffraction peak intensities at (001) and (002) planes than those from the other planes. The ruthenic acid compound layers (nanosheets) in the layered ruthenic acid compound have a thickness of 1 nm or smaller, respectively. The thickness is preferably 0.1 nm or larger.

The ruthenic acid nanosheet of the present invention is obtained by the steps of:

(a) mixing ruthenium oxide and an alkali metal compound and sintering or melting the resulting mixture to obtain a layered alkaline metal-ruthenate compound containing a ruthenic acid nanosheet having a thickness of 1 nm or smaller;

(b) treating the layered alkaline metal-ruthenate compound in an acidic solution to exchange at least part of alkali metal with proton to obtain a protonic layered ruthenic acid hydrate;

(c) reacting the protonic layered ruthenic acid hydrate with alkylammonium or alkylamine to obtain a layered alkylammonium-ruthenic acid intercalation compound; and (d) mixing the layered alkylammonium-ruthenic acid intercalation compound with a solvent to obtain a colloid containing a ruthenic acid nanosheet having a thickness of 1 nm or smaller.

Step (a):

First, ruthenium oxide and an alkali metal compound are mixed and the resulting mixture is heated or melted to obtain a layered alkaline metal-ruthenate compound containing ruthenic acid nanosheets having a thickness of 1 nm or smaller.

The obtained layered alkaline metal-ruthenate compound, a kind of layered ruthenic acid compound, is represented by the formula (3):

   (3)

(where M is an ion of alkali metal such as Li, Na, K, Rb or Cs, $0<x<1$ and $0 \leq n \leq 10$).

According to a first method for synthesizing the layered alkaline metal-ruthenate compound, an alkali metal carbonate or nitrate is mixed with ruthenium oxide and the resulting mixture is heated at 700-900° C., preferably in an inert atmosphere (solid phase reaction method).

According to a second synthesis method, an alkali metal hydroxide and ruthenium oxide are mixed and the resulting mixture is melted at 500-700° C. (melting method).

The layered alkaline metal-ruthenate compound represented by the above formula (3) may be obtained by a third synthesis method of mixing a layered ruthenic acid compound and an alkali metal nitrate and melting the resulting mixture at a temperature higher than the melting point of the alkali metal nitrate, preferably in an inert atmosphere (ion exchange by melting).

The layered alkaline metal-ruthenate compound may also be obtained by a fourth synthesis method of dispersing a protonic layered ruthenic acid hydrate described later in an aqueous solution of alkaline metal hydroxide or chloride, followed by stirring.

Step (b):

Then, the layered alkaline metal-ruthenate compound is treated in an acidic solution to exchange at least part of alkali metal with proton. Thereby, a protonic layered ruthenic acid hydrate is obtained.

The protonic layered ruthenic acid hydrate obtained in the step (b) is represented by the formula (4):

   (4)

(where M is an ion of alkali metal such as Li, Na, K, Rb or Cs, $0<x<1$, $0 \leq y<x$ and $0 \leq n \leq 10$).

The protonic layered ruthenic acid hydrate may be synthesized by subjecting the layered alkaline metal-ruthenate compound to a proton exchange reaction in an acidic aqueous solution (proton exchange method).

The protonic layered ruthenic acid hydrate may be a layered ruthenic acid salt represented by the formula (5):

   (5)

(where M is an ion of bivalent metal such as Mg, Ca, Sr or Ba or trivalent metal such as Y or Ln, $0<x<1$, $0 \leq y<x$ and $0 \leq n \leq 10$).

The layered ruthenic acid salt may be synthesized by reacting the protonic layered ruthenic acid hydrate represented by the above formula (4) with an aqueous solution containing the ion of metal M in the formula (5) (in-solution ion exchange method).

Step (c):

In the step (c), the protonic layered ruthenic acid hydrate is reacted with alkylammonium or alkylamine to obtain a layered alkylammonium-ruthenic acid intercalation compound.

The obtained layered alkylammonium-ruthenic acid intercalation compound has a structure in which alkylammonium is intercalated in the layered ruthenic acid compound, which is represented by the formula (2):

   (2)

[where M is an ion of alkali metal such as Li, Na, K, Rb or Cs, B is alkylammonium represented by $(R)_m NH_{4-m}$ or $(R)_{m-p}(R')_p NH_{4-m}$ (R and R' is $CH_3(CH_2)_q$, respectively, m=0 to 4, p=0 to 3 and q=0 to 18), $0<x<1$, $0 \leq y<x$, $0 \leq z<y$ and $0 \leq n \leq 10$].

In the step (c), the above-described intercalation compound is obtained by a first method of mixing the protonic layered ruthenic acid hydrate with a solution containing alkylammonium salt to cause a reaction between them (ion exchange method).

According to a second method, the protonic layered ruthenic acid hydrate is mixed with a solution containing alkylamine to cause a reaction between them, thereby obtaining the above-described intercalation compound (acid-base reaction method).

Further, the obtained layered alkylammonium-ruthenic acid intercalation compound may be mixed with a solution containing another alkylammonium salt to cause a reaction between them (guest exchange reaction method).

Step (d):

As the final step, the layered alkylammonium-ruthenic acid intercalation compound is mixed with a solvent to obtain a colloid containing ruthenic acid nanosheets each having a thickness of 1 nm or smaller. More specifically, the layered alkylammonium-ruthenic acid intercalation compound is dispersed in a high dielectric solvent.

As the high dielectric solvent, at least one solvent is selected from the group consisting of water, alcohol, acetonitrile, dimethyl sulfoxide, dimethylformamide and propylene carbonate. Among them, water, alcohol or acetonitrile is preferable in view of high dielectric constant, low viscosity and low boiling point. Above all, methanol is particularly preferable.

By dispersing the above-described intercalation compound in the high dielectric solvent, layers of the intercalation compound are isolated from each other. Thereby, a colloid dispersing the ruthenic acid nanosheets therein is obtained. The colloid may contain the layered ruthenic acid compound, i.e., a stack of several nanosheets. From this colloid, the ruthenic acid nanosheet of the present invention, which is porous and has excellent proton and electron conductivity, is collected.

Hereinafter, the present invention is described in further detail, but the invention is not limited thereto.

EXAMPLES

Example 1

Step (a)

1. Synthesis of Layered Potassium Ruthenate

A layered potassium ruthenate was synthesized by a solid phase method or melting method as described below.

(1) Synthesis by Solid Phase Method $K_2CO_3$ and $RuO_2$ were mixed in the molar ratio of 0.625:1 and the resulting mixture was sintered by heating under an Ar gas flow at 850° C. for 12 hours. Then, the sintered mixture was washed with distilled water to remove excess potassium. After washing, a solid component was collected from the mixture by filtration or centrifugation.

The synthesis was favorably performed when the molar ratio of $K_2CO_3$ to $RuO_2$ was in the range of 0.2 to 1.5, preferably 0.5 to 0.7. Further, it was possible to carry out the sintering even in an atmospheric air, but an inert atmosphere such as Ar gas was preferable. The sintering was favorably performed at a temperature of 700-900° C.

(2) Preparation by Melting Method

KOH and $RuO_2$ were mixed in the molar ratio of 3:1 and the resulting mixture was melted by heating in air at 600° C. for 0.5 hours. The melted mixture was washed with distilled water to remove excess potassium. After washing, a solid component was collected from the mixture by filtration or centrifugation. The collected solid component was air-dried to obtain a hydrate, which was then dried at 120° C. or higher to obtain an anhydrate.

The synthesis was favorably performed when the molar ratio of KOH to $RuO_2$ was in the range of 2 to 3. The melting was favorably performed at a temperature of 500-700° C.

(3) Preparation by Ion Exchange Method

A layered potassium ruthenate was synthesized by subjecting a protonic layered ruthenic acid hydrate described later to ion exchange.

First, a protonic layered ruthenic acid hydrate was dispersed in a KOH or KCl aqueous solution, which was stirred at 60-80° C. to obtain a hydrated layered potassium ruthenate. The resulting hydrated layered potassium ruthenate was washed with distilled water to remove an excess of potassium and a solid component was collected by filtration or centrifugation. The collected solid component was air-dried to obtain a hydrate, which was then dried at 120° C. or higher to obtain an anhydrate.

2. Synthesis of Layered Cesium Ruthenate $Cs_2CO_3$ and $RuO_2$ were mixed in the molar ratio of 0.192:1 and the resulting mixture was sintered by heating under an Ar gas flow at 900° C. for 120 hours.

The synthesis was favorably performed when the molar ratio of $Cs_2CO_3$ to $RuO_2$ was in the range of 0.1 to 1.0, preferably 0.15 to 0.30. Further, it was possible to carry out the sintering in an atmospheric air, but an inert atmosphere such as Ar gas was preferable. The sintering was favorably performed even at a temperature of 800-1000° C., preferably 700-900° C.

3. Evaluations of Physical Properties of Layered Potassium Ruthenate (1) Composition The layered potassium ruthenate synthesized in the above section 1 was subjected to inductively coupled plasma emission spectroscopy, thermogravimetric analysis, fluorescence X-ray analysis and X-ray photoelectron spectroscopy to find the composition thereof: $K_xRuO_{2+0.5x} \cdot nH_2O$. Value x varied in the range of $0<x<1$ depending on the synthesis conditions such as sintering temperature, sintering time and the mixture ratio of the raw materials. For example, x=0.22 was established when the mixing ratio $K_2CO_3:RuO_2$ was 0.625:1 (molar ratio) and the sintering was performed under the Ar gas flow at 850° C. for 12 hours. Water content n varied in the range of $0 \leq n \leq 10$ depending on the drying conditions. For example, n=0.7 was established when the sintered mixture was air-dried at room temperature, while $0 \leq n \leq 0.4$ was satisfied when the sintered mixture was dried at 120° C. The water content n may be optimized in view of the intended electrochemical device.

(2) Morphology

Figure 2:
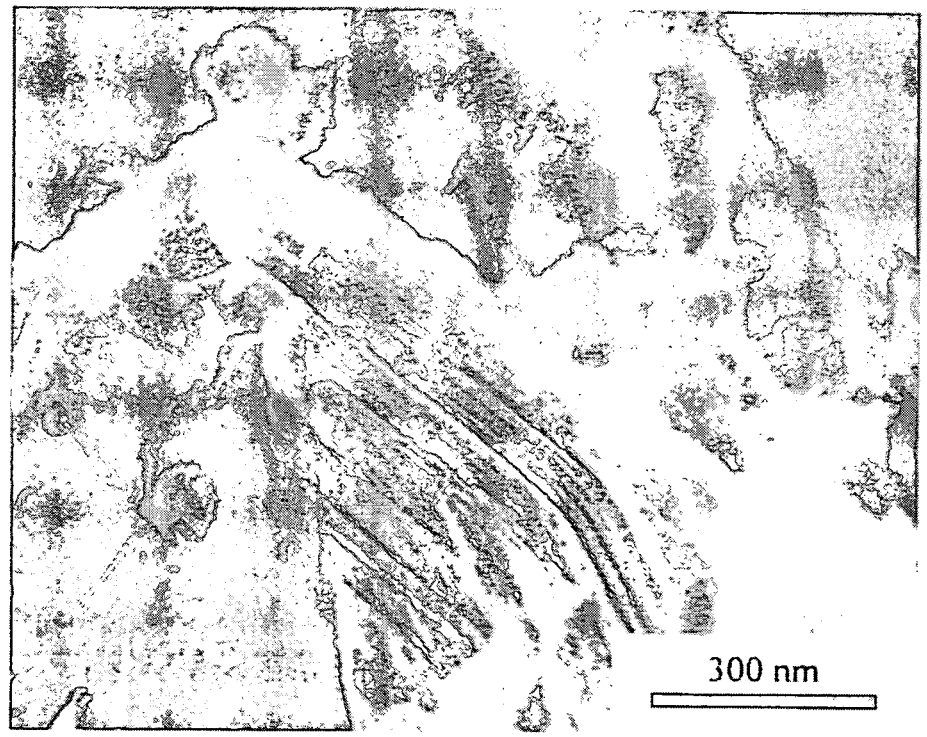
FIG. 2 is an enlargement of the scanning electron microscopic image shown in FIG. 1.

The layered potassium ruthenate synthesized in the above section 1 was observed using a scanning electron microscope (SEM). FIGS. 1 and 2 show the obtained SEM images. As seen in FIGS. 1 and 2, the layered potassium ruthenate showed a plate-like crystal of several hundred nm in length and width and several ten nm in thickness.

(3) Structure

Figure 3:
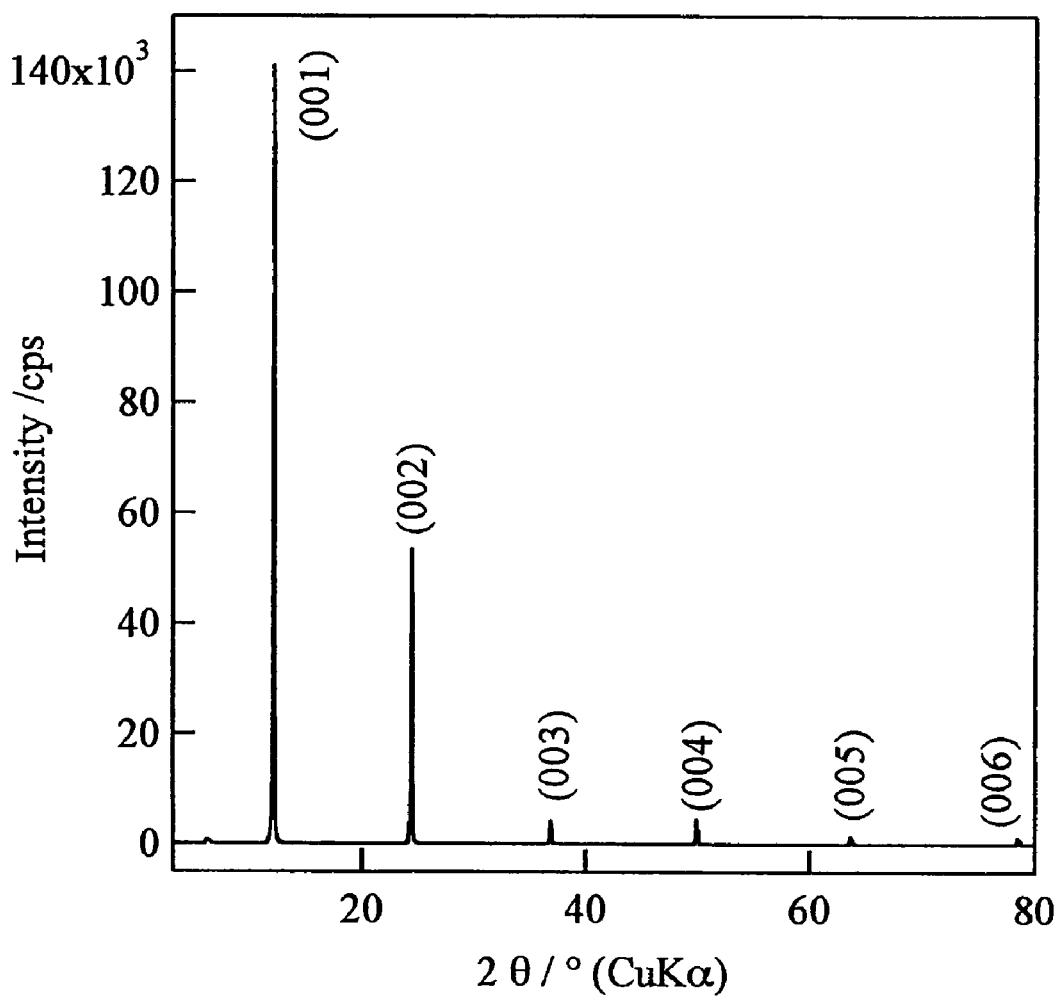
FIG. 3 is a powder X-ray diffraction (XRD) pattern of the layered potassium ruthenate of the present invention.

FIG. 3 shows a powder X-ray diffraction (XRD) pattern of $K_xRuO_{2+0.5x} \cdot nH_2O$ (x=0.22, n=0.4). FIG. 3 indicates that a layered structure having a basal interplanar spacing $d_{001}$ of 0.730 nm was obtained.

In this context, the basal interplanar spacing is the interval between stacked layers in a layered structure along the direction vertical to the layer plane. More specifically, the basal interplanar spacing is the one between regularly ordered ruthenium oxide layers (ruthenic acid nanosheets).

As described later, the basal interplanar spacing varies depending on the kind of metal ion and organic component intercalated in the structure of the layered ruthenic acid compound. Table 1 shows the diffraction peak indexing of the layered potassium ruthenate. Peak intensities at other planes than (00L) planes were too low (about 1/1000) to define their indexes.

Figure 4:
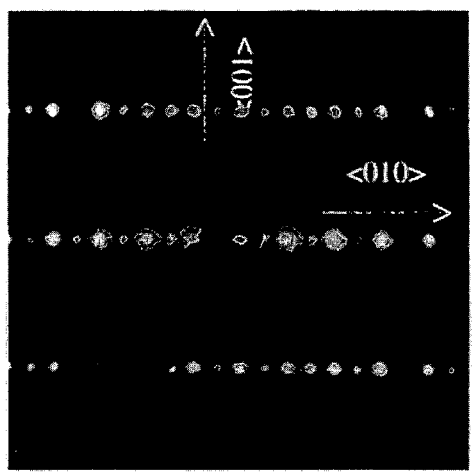
FIG. 4 is an electron diffraction pattern of the layered potassium ruthenate of the present invention.
Figure 5:
FIG. 5 is a transmission electron microscopic image of the layered potassium ruthenate of the present invention.

FIGS. 4 and 5 show an electron diffraction image and a transmission electron microscopic image of $K_{0.22}RuO_{2.11} \cdot 0.4H_2O$, respectively. The images show that the ruthenium oxide layers each have a thickness of 1 nm or smaller and are regularly ordered in two-dimensional array.

TABLE 1

XRD peak indexing of $K_{0.22}RuO_{2.11} \cdot 0.4H_2O$ ($3 \leq 2\theta(CuK\alpha) \leq 80$)

| 2θ/° (CuKα) | d/nm | H | K | L | Peak intensity ratio |
|---|---|---|---|---|---|
| 12.12 | 0.730 | 0 | 0 | 1 | 100 |
| 24.36 | 0.365 | 0 | 0 | 2 | 40 |
| 36.88 | 0.244 | 0 | 0 | 3 | 3 |
| 49.88 | 0.183 | 0 | 0 | 4 | 3 |
| 63.62 | 0.146 | 0 | 0 | 5 | 1 |
| 78.48 | 0.122 | 0 | 0 | 6 | 1 |

4. Evaluations of Physical Properties of Layered Cesium Ruthenate (1) Composition The layered cesium ruthenate prepared in the above section 2 was subjected to thermogravimetric analysis and fluorescence X-ray analysis to find the composition thereof: $Cs_xRuO_{2+0.5x} \cdot nH_2O$. Value x varied in the range of $0<x<1$ depending on the synthesis conditions such as sintering temperature, sintering time and the mixture ratio of the raw materials. For example, x=0.35 was established when the mixing ratio $Cs_2CO_3:RuO_2$ was 0.192:1 (molar ratio) and the sintering was performed under the Ar gas flow at 900° C. for 12 hours. Water content n varied in the range of $0 \leq n \leq 10$ depending on the drying conditions. For example, n=0.7 was established when the sintered mixture was air-dried at room temperature, while $0 \leq n \leq 0.4$ was satisfied when the sintered mixture was dried at 120° C. The water content n may be optimized in view of the intended electrochemical device.

(2) Morphology

The layered cesium ruthenate synthesized in the above section 2 was observed using an SEM to obtain an SEM image. The layered cesium ruthenate showed a plate-like crystal of several hundred nm in length and width and several ten nm in thickness.

(3) Structure

Figure 6:
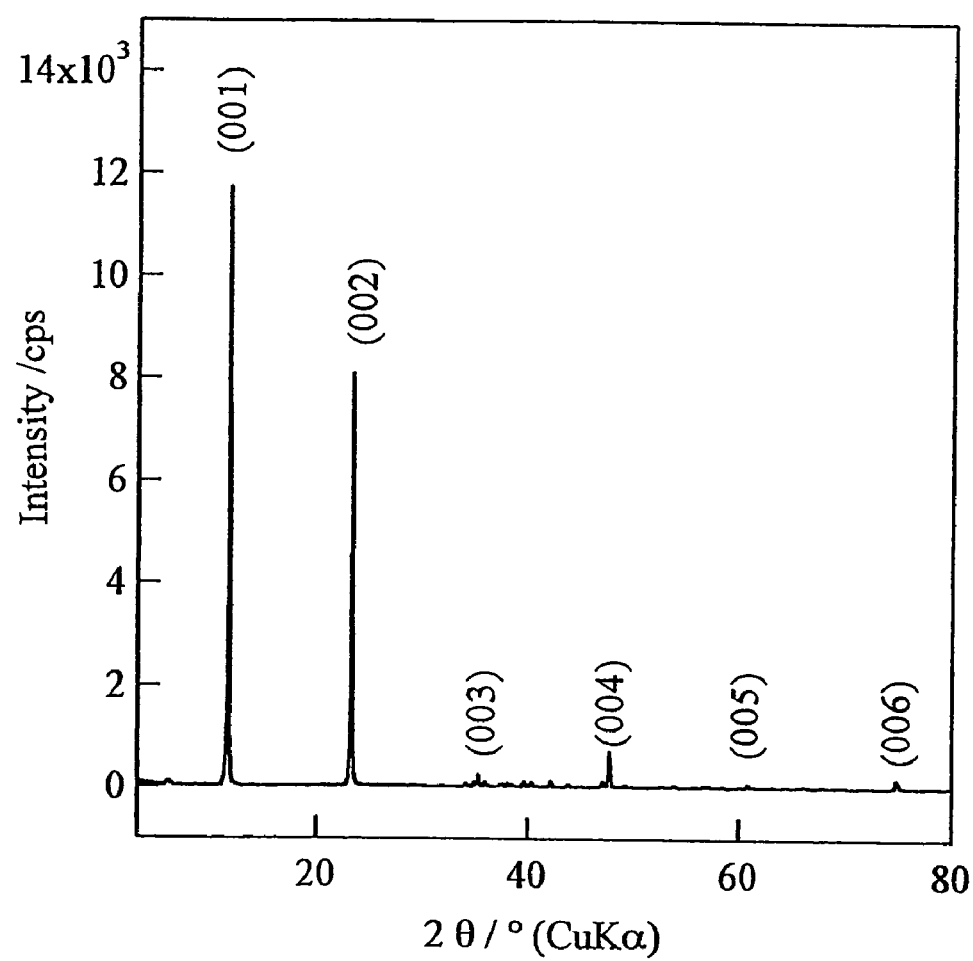
FIG. 6 is a powder X-ray diffraction (XRD) pattern of a layered cesium ruthenate of the present invention.

FIG. 6 shows a powder X-ray diffraction (XRD) pattern of $Cs_xRuO_{2+0.5x} \cdot nH_2O$ (x=0.35, n=0.4). FIG. 6 indicates that a layered structure having a basal interplanar spacing $d_{001}$ of 0.762 nm was obtained. Table 2 shows the diffraction peak indexing of the layered cesium ruthenate. Peak intensities at other planes than (00L) planes were too low (about 1/1000) to define their indexes.

TABLE 2

XRD peak indexing of $Cs_xRuO_{2+0.5x} \cdot nH_2O$ ($3 \leq 2\theta(CuK\alpha) \leq 80$)

| 2θ/° (CuKα) | d/nm | H | K | L | Peak intensity ratio |
|---|---|---|---|---|---|
| 11.62 | 0.762 | 0 | 0 | 1 | 100 |
| 23.36 | 0.381 | 0 | 0 | 2 | 72 |
| 35.34 | 0.254 | 0 | 0 | 3 | 2 |
| 47.74 | 0.191 | 0 | 0 | 4 | 6 |
| 60.78 | 0.152 | 0 | 0 | 5 | 1 |
| 74.76 | 0.127 | 0 | 0 | 6 | 2 |

Step (b)

1. Preparation of protonic layered ruthenic acid hydrate

Using the layered ruthenic acid compound synthesized in the above step (a) as a starting material, a proton exchange reaction was carried out to synthesize a protonic layered ruthenic acid hydrate.

First, the layered potassium ruthenate was stirred in diluted hydrochloric acid at 60° C. for 48 hours. Then, an excess of hydrochloric acid was washed away with distilled water and a solid component was collected by filtration or centrifugation. Even with use of other acids than hydrochloric acid, such as sulfuric acid, nitric acid and hydrogen bromide, the same result was obtained. Time and temperature for the stirring were varied depending on the amount to be synthesized. Synthesis at room temperature was also possible, but the reaction time was prolonged.

2. Evaluations of Physical Properties of Protonic Layered Ruthenic Acid Hydrate (1) Composition The protonic layered ruthenic acid hydrate prepared in the above section 1 was subjected to inductively coupled plasma emission spectroscopy, thermogravimetric analysis, fluorescence X-ray analysis and X-ray photoelectron spectroscopy to find the composition thereof: $K_{x-y}H_yRuO_{2+0.5x} \cdot nH_2O$ (where $0<x<1$, $0 \leq y<x$ and $0 \leq n \leq 10$). Value y representing the amount of H varied depending on the conditions for the acid treatment. For example, x−y<0.05 was satisfied when the acid treatment was performed at 60° C. for 48 hours. Water content n was 0.4 after drying at 120° C., though it was varied from 0 to 10 depending on the drying conditions.

(2) Morphology

Figure 7:
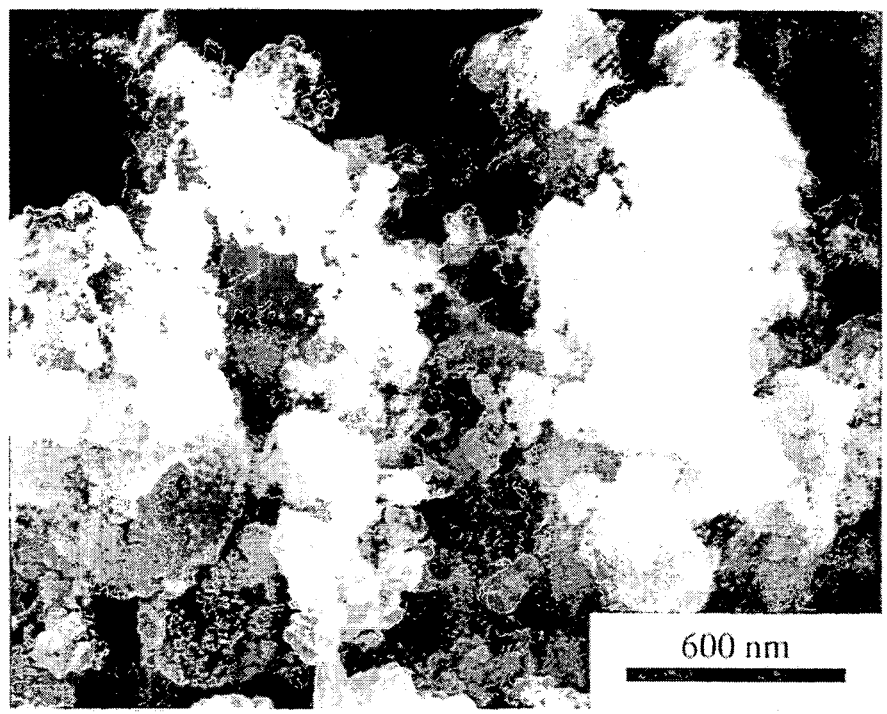
FIG. 7 is a scanning electron microscopic image of a protonic layered ruthenic acid hydrate of the present invention.
Figure 8:
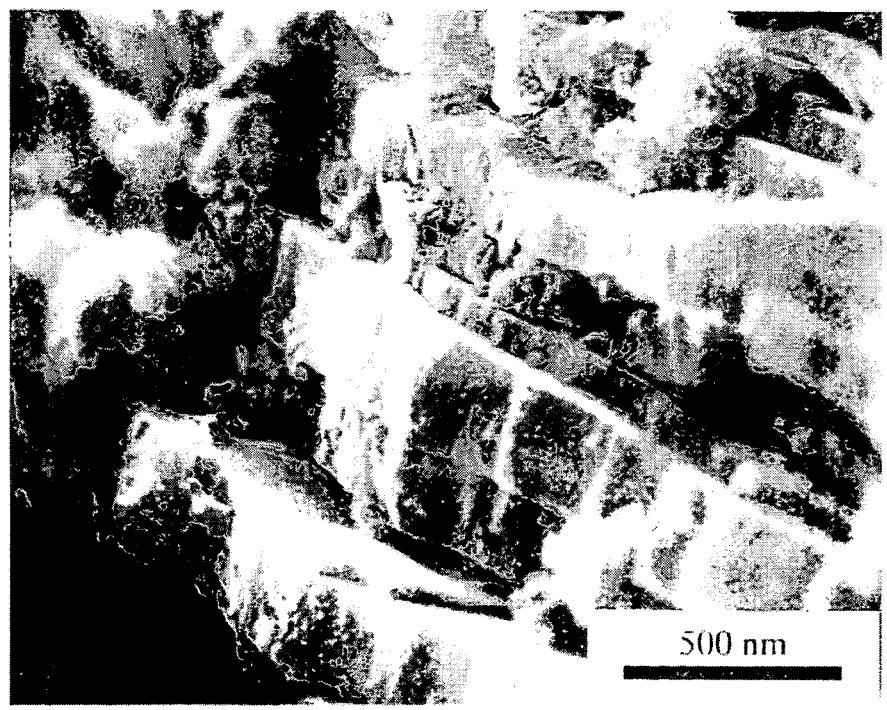
FIG. 8 is an enlargement of the scanning electron microscopic image shown in FIG. 7.

The protonic layered ruthenic acid hydrate prepared in the above section 1 was observed using an SEM. FIGS. 7 and 8 show the obtained SEM images. As seen in FIGS. 7 and 8, the protonic layered ruthenic acid hydrate showed a plate-like crystal of several hundred nm in length and width and several ten nm in thickness.

(3) Structure

Figure 9:
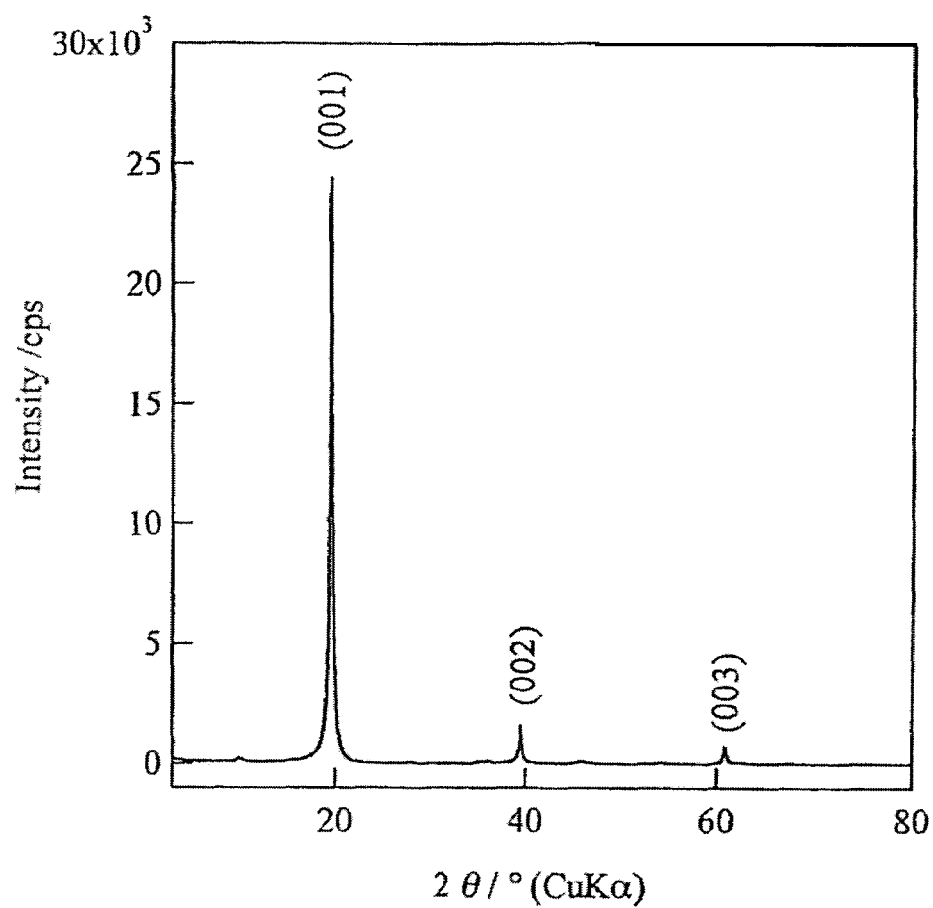
FIG. 9 is a powder X-ray diffraction pattern of the protonic layered ruthenic acid hydrate of the present invention.

FIG. 9 shows a powder X-ray diffraction (XRD) pattern of $H_{0.22}RuO_{2.11} \cdot nH_2O$ (n=0.4). FIG. 9 indicates that a layered structure having a basal interplanar spacing $d_{001}$ of 0.457 nm was obtained. Table 3 shows the diffraction peak indexing of the protonic layered ruthenic acid hydrate. Peak intensities at other planes than (00L) planes were too low (about 1/1000) to define their indexes.

TABLE 3

XRD peak indexing of
$H_{0.22}RuO_{2.11} \cdot 0.4H_2O$ ($3 \leq 2\theta(CuK\alpha) \leq 80$)

| 2θ/° (CuKα) | d/nm | h | k | l | Peak intensity ratio |
|---|---|---|---|---|---|
| 19.46 | 0.456 | 0 | 0 | 1 | 100 |
| 39.34 | 0.229 | 0 | 0 | 2 | 6 |
| 60.94 | 0.152 | 0 | 0 | 3 | 3 |

Figure 10:
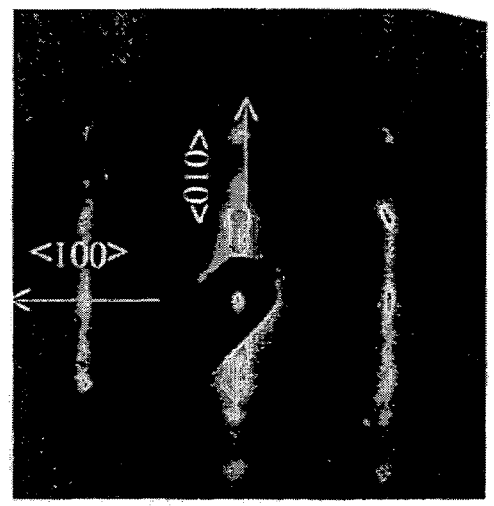
FIG. 10 is an electron diffraction pattern of the protonic layered ruthenic acid hydrate of the present invention.
Figure 11:
FIG. 11 is a transmission electron microscopic image of the protonic layered ruthenic acid hydrate of the present invention.

FIGS. 10 and 11 show an electron diffraction image and a transmission electron microscopic image of $H_{0.22}RuO_{2.11} \cdot 0.4H_2O$, respectively. As seen in the images, the layers are stacked at a spacing of about 0.5 nm. Further, it is estimated that a single ruthenium oxide layer (ruthenic acid nanosheet) has a thickness of about 0.5 nm and the layers are regularly ordered in two-dimensional array. Further, diffraction spots were clearly observed in the electron diffraction image, indicating that the ruthenium oxide layer has high crystallinity.

In the structure of the protonic layered ruthenic acid compound, ruthenium oxide layers of about 0.5nm thick and hydrated water are regularly arranged in two-dimensional array to give a well crystalline structure. Further, the surface of the ruthenium oxide layer is covered with a hydroxyl group. Since the degree of hydration is independent of the structure, the protonic layered ruthenic acid compound is able to contain water to such an extent that it almost reaches an infinite swelling state. In the existing amorphous hydrous oxide and electrolytically oxidized ruthenium hydrate, the arrangement of the ruthenium oxide and water is disordered and the water molecule exists in the gap of the structure. Therefore, the degree of hydration is limited by the macrostructure to some extent.

Step (c)

1. Synthesis of Layered Alkylammonium-ruthenic Acid intercalation Compound

A layered alkylammonium-ruthenic acid intercalation compound was obtained by an ion exchange reaction, an acid-base reaction or a guest exchange reaction as described below.

(1) Synthesis by Ion Exchange Reaction

The protonic layered ruthenic acid hydrate synthesized in the above step (b) was dispersed in an aqueous alkylammonium solution, which was stirred at room temperature for 3 days. Then, excess organic substance was washed away with distilled water and a solid component was collected by filtration or centrifugation. Alkylammonium used was $(R)_mNH_{4-m}$ or $(R)_{m-n}(R')_nNH_{4-m}$ (where R and R' are $CH_3(CH_2)_p$, respectively, m =0 to 4, n=0 to 3 and p=0 to 18).

(2) Synthesis by Acid-base Reaction

The protonic layered ruthenic acid hydrate synthesized in the above step (b) was dispersed in an aqueous alkylamine solution, which was stirred at room temperature for 3 days. Then, excess organic substance was washed away with distilled water and a solid component was collected by filtration or centrifugation. Alkylamine used was $(R)_mNH_{3-m}$ or $(R)_{m-n}(R')_nNH_{3-m}$ (where R and R' are $CH_3(CH_2)_p$, respectively, m=0 to 3, n=0 to 2 and p=0 to 18).

(3) Synthesis by Guest Exchange Reaction

A layered alkylammonium-ruthenic acid intercalation compound was dispersed in an aqueous alkylammonium solution, which was stirred at room temperature for 3 days. Then, excess organic substance was washed away with distilled water and a solid component was collected by supercentrifugation. Alkylammonium used was the same as that used in the synthesis in the above section (1) by the ion exchange reaction.

2. Evaluations of Physical Properties of Layered alkylammonium-ruthenic acid intercalation compound (1) Composition The layered alkylammonium-ruthenic acid intercalation compound synthesized in the above section 1 was subjected to thermogravimetric analysis to find the composition thereof:

H:alkylammonium:Ru=y−z:z:1 (molar ratio)

where value z representing an organic substance content varies depending on the preparation conditions and the kind of alkyl chain and y<1.

(2) Morphology

Figure 12:
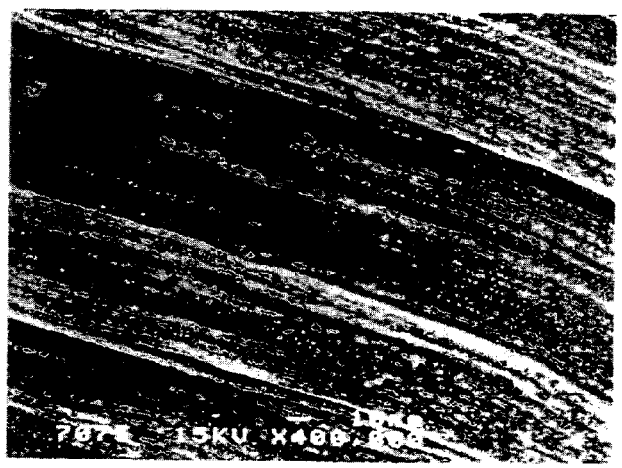
FIG. 12 is a scanning electron microscopic image of a layered cetyltrimethylammonium-ruthenic acid intercalation compound of the present invention.

FIG. 12 shows an SEM image of a layered cetyltrimethylammonium-ruthenic acid intercalation compound ($[CH_3(CH_2)_{15}N(CH_3)_3]_{0.2}RuO_{2.1}$), which is one of the intercalation compounds synthesized in the above section 1. As seen in this image, the layers are arranged in a stripe pattern at a spacing of about 2.8 nm.

(3) Structure

Figure 13:
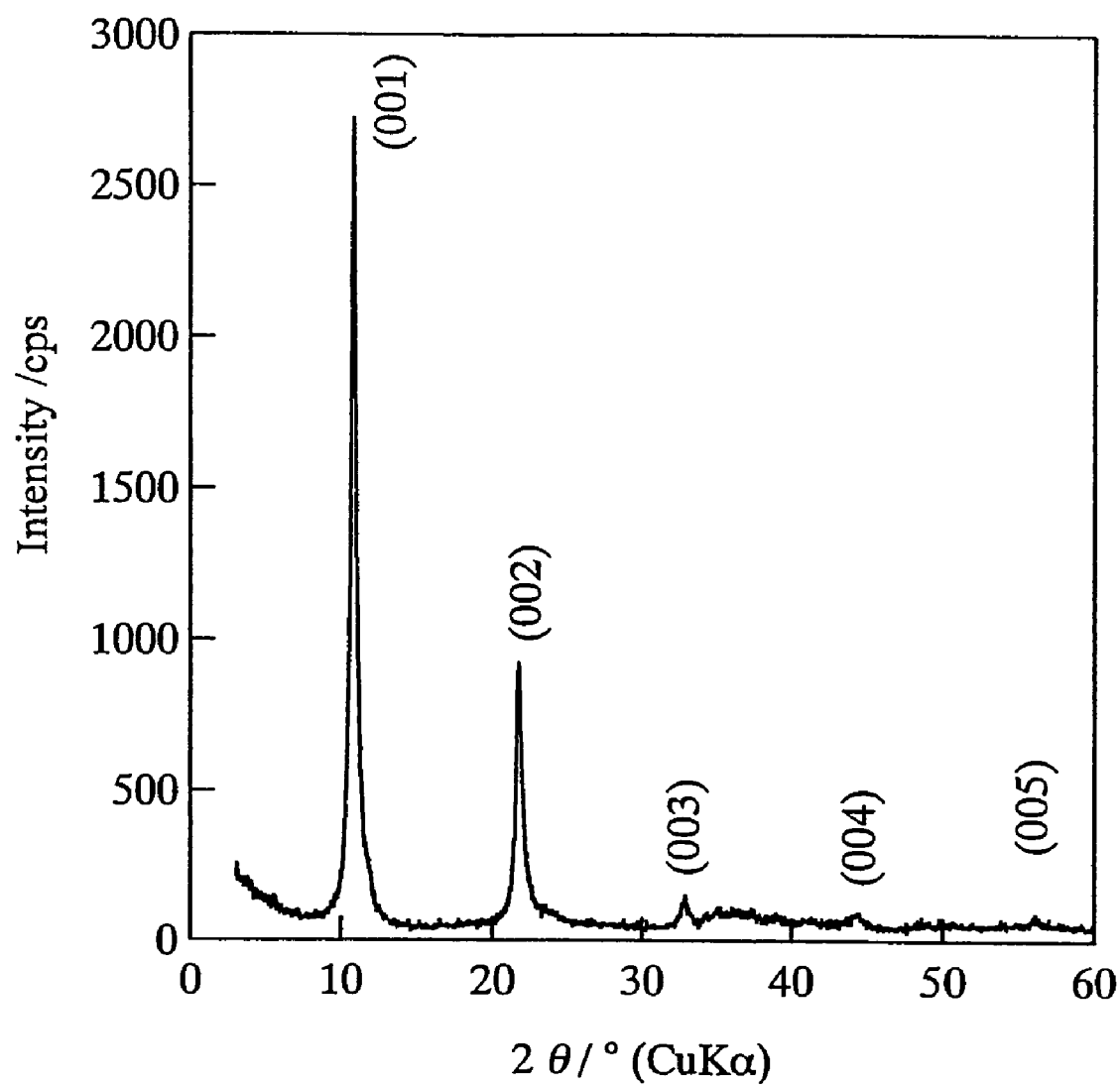
FIG. 13 is a powder X-ray diffraction pattern of a layered ethylammonium-ruthenic acid intercalation compound of the present invention.
Figure 15:
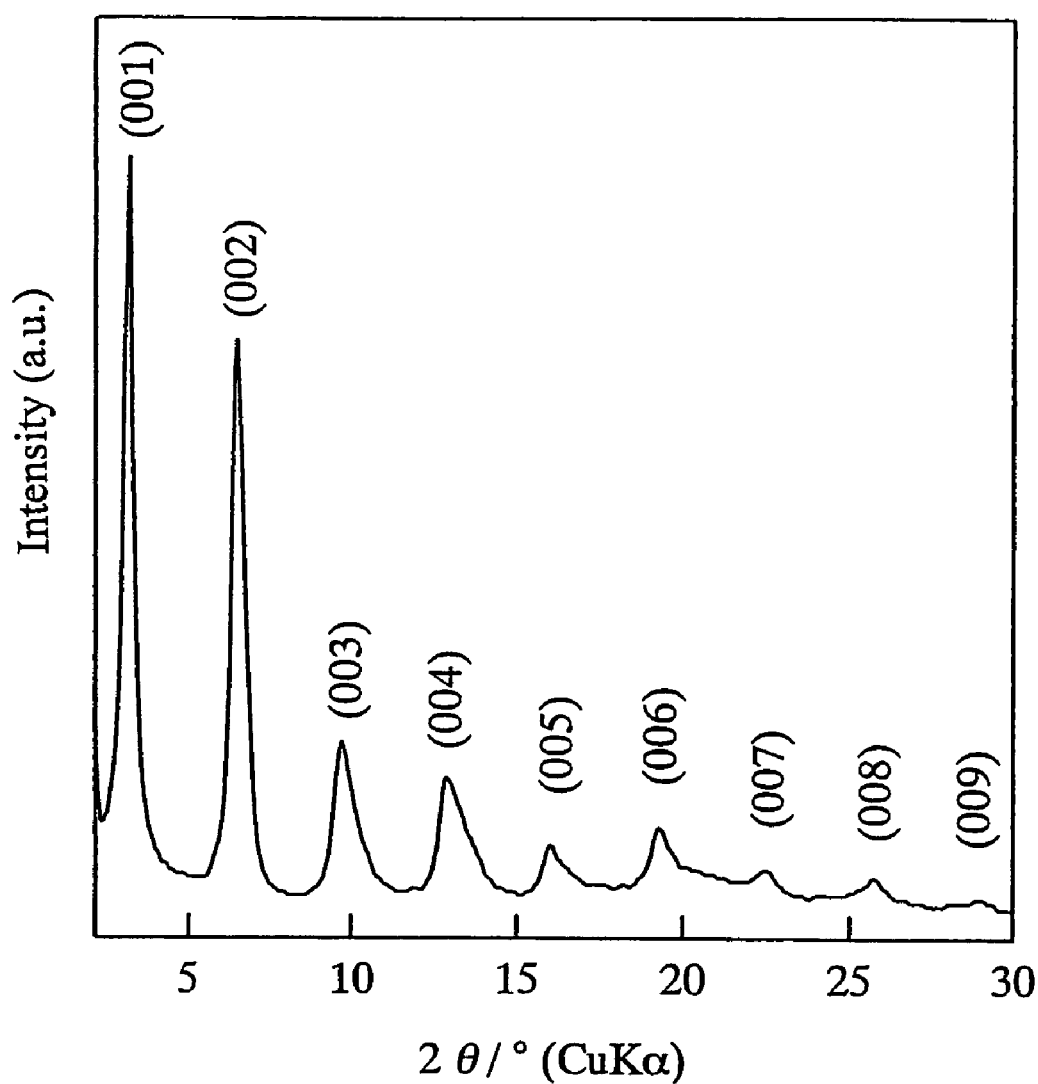
FIG. 15 is a powder X-ray diffraction pattern of the layered cetyltrimethylammonium-ruthenic acid intercalation compound of the present invention.

FIGS. 13, 14 and 15 show powder X-ray diffraction patterns of a layered ethylammonium-ruthenic acid intercalation compound, a layered tetrabutylammonium-ruthenic acid intercalation compound and a layered cetyltrimethylammonium-ruthenic acid intercalation compound synthesized in the above section 1, respectively. As seen in the diffraction patterns, the compounds had layered structures having the basal interplanar spacing $d_{001}$ of 0.816 nm, 1.68 nm and 2.76 nm, respectively. Tables 4, 5 and 6 show the diffraction peak indexes of these compounds.

TABLE 4

XRD peak indexing of layered ethylammonium-ruthenic acid
intercalation compound ($3 \leq 2\theta(CuK\alpha) \leq 60$)

| 2θ/° (CuKα) | d/nm | h | k | l | Peak intensity |
|---|---|---|---|---|---|
| 10.86 | 0.815 | 0 | 0 | 1 | 100 |
| 21.72 | 0.409 | 0 | 0 | 2 | 3 |
| 32.92 | 0.272 | 0 | 0 | 3 | 1 |
| 44.38 | 0.204 | 0 | 0 | 4 | <1 |
| 56.10 | 0.164 | 0 | 0 | 5 | <1 |

TABLE 5

XRD peak indexing of layered tetrabutylammonium-ruthenic acid
intercalation compound ($3 \leq 2\theta(CuK\alpha) \leq 60$)

| 2θ/° (CuKα) | d/nm | h | k | l | Peak intensity |
|---|---|---|---|---|---|
| 5.22 | 1.693 | 0 | 0 | 1 | 100 |
| 10.46 | 0.846 | 0 | 0 | 2 | 42 |
| 15.82 | 0.560 | 0 | 0 | 3 | 26 |
| 21.22 | 0.419 | 0 | 0 | 4 | 22 |
| 26.66 | 0.334 | 0 | 0 | 5 | 13 |
| 32.16 | 0.334 | 0 | 0 | 6 | 7 |
| 37.76 | 0.334 | 0 | 0 | 7 | 7 |
| 43.56 | 0.334 | 0 | 0 | 8 | 7 |

TABLE 6

XRD peak indexing of layered cetyltrimethylammonium-ruthenic acid intercalation compound ($2 \leq 2\theta(CuK\alpha) \leq 60$)

| 2θ/° (CuKα) | d/nm | h | k | l | Peak intensity |
|---|---|---|---|---|---|
| 3.22 | 2.742 | 0 | 0 | 1 | 100 |
| 6.48 | 1.364 | 0 | 0 | 2 | 77 |
| 9.69 | 0.913 | 0 | 0 | 3 | 25 |
| 12.88 | 0.688 | 0 | 0 | 4 | 20 |
| 15.99 | 0.554 | 0 | 0 | 5 | 12 |
| 19.32 | 0.460 | 0 | 0 | 6 | 14 |
| 22.50 | 0.395 | 0 | 0 | 7 | 9 |
| 25.75 | 0.346 | 0 | 0 | 8 | 8 |
| 28.80 | 0.310 | 0 | 0 | 9 | 5 |

Step (d)

1. Preparation of Colloid Containing Ruthenic Acid Nanosheet

A layered tetrabutylammonium-ruthenic acid intercalation compound was dispersed in a solvent to obtain colloidal ruthenic acid nanosheets (a colloid containing the nanosheets).

More specifically, the layered tetrabutylammonium-ruthenic acid intercalation compound synthesized in the step (c) was dispersed in a high dielectric solvent, which was stirred by ultrasonic treatment. Then, a colloid component (supernatant) was collected by centrifugation (2000 rpm). The high dielectric solvent used was methanol.

2. Evaluations of Physical Properties of Colloidal Ruthenic acid Nanosheet (1) Composition The obtained colloid contained the high dielectric solvent, tetrabutylammonium and ruthenic acid nanosheets in the molar ratio of (100−x):0.075x:x. Value x represents a concentration of the layered tetrabutylammonium-ruthenic acid intercalation compound, which was about 2 to 100 μg/L.

(2) Morphology

FIG. 16 shows an SEM image of the ruthenic acid nanosheet contained in the colloid obtained in the above step (d). The colloid was supported on a carbon material support for the observation. FIG. 16 shows that an isolated crystalline nanosheet having a length and width of several hundred nm and a thickness of the nanometer order was obtained.

(3) Structure

Figure 17:
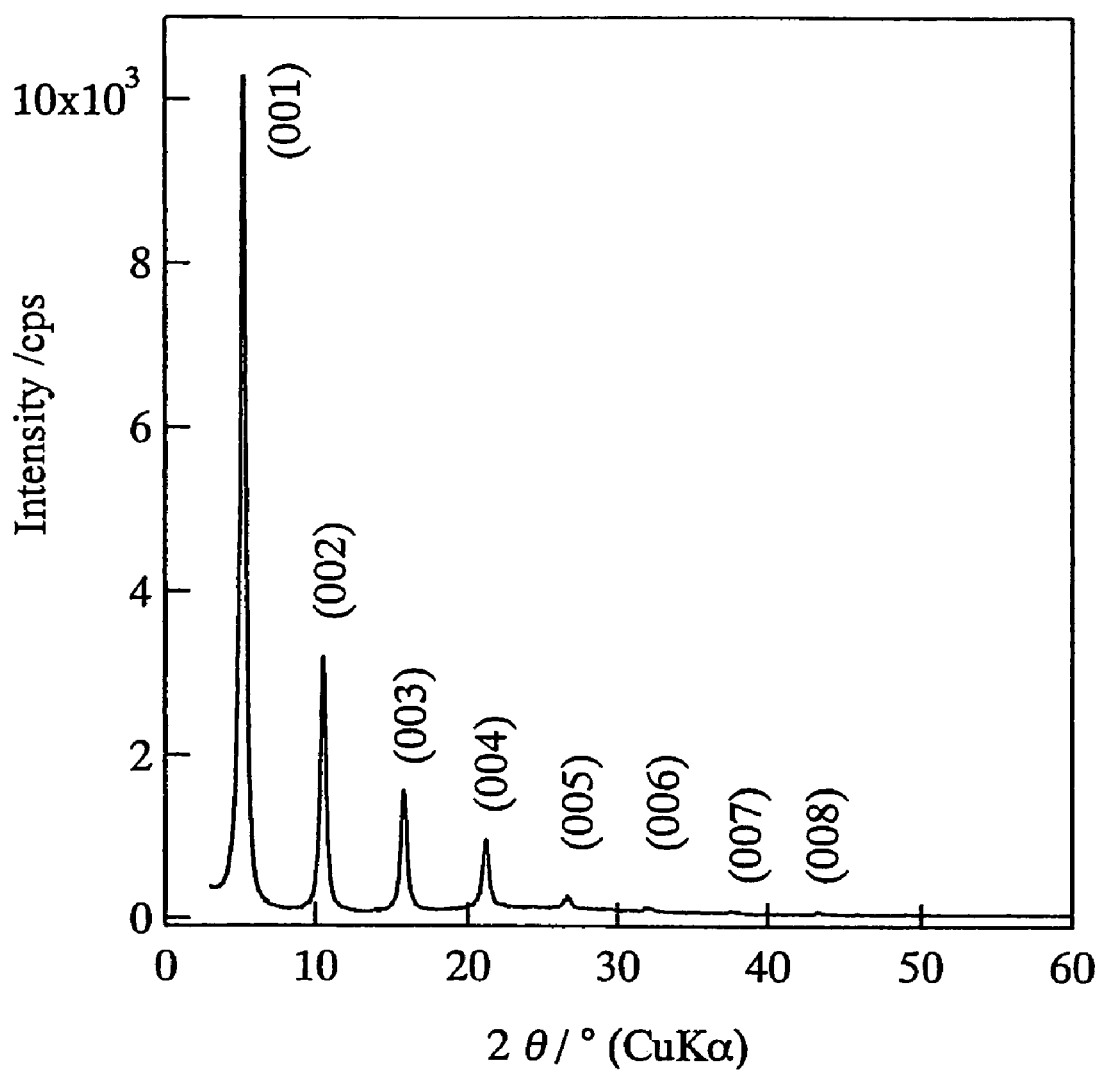
FIG. 17 is a powder X-ray diffraction pattern of an oriented thin film obtained by re-stacking the ruthenic acid nanosheets of the present invention.
Figure 18:
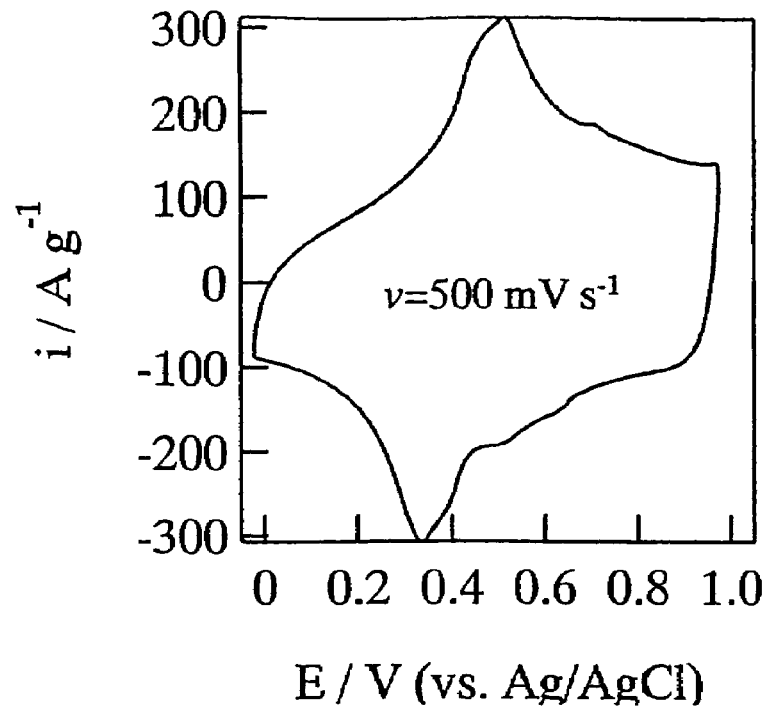
FIG. 18 is a cyclic voltammogram of an HRO/GC electrode of the present invention at a scan rate of 500 mV/s.
Figure 19:
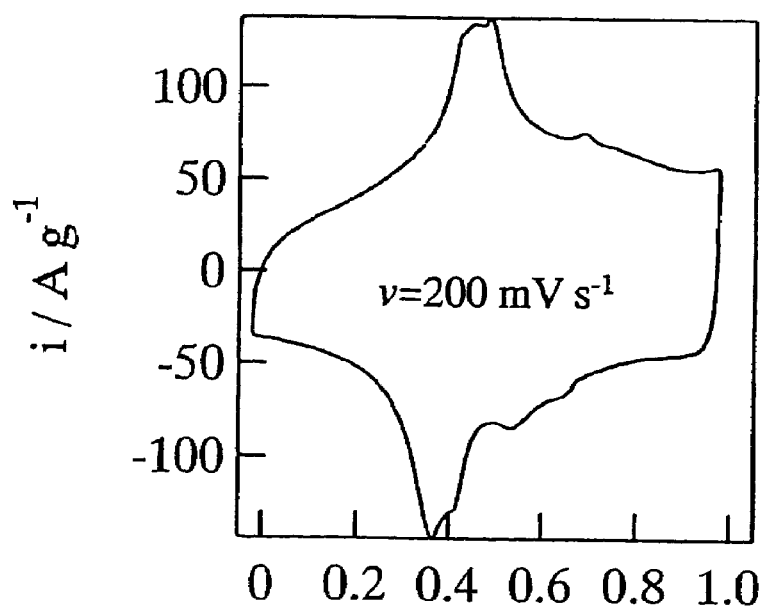
FIG. 19 is a cyclic voltammogram of the HRO/GC electrode of the present invention at a scan rate of 200 mV/s.
Figure 20:
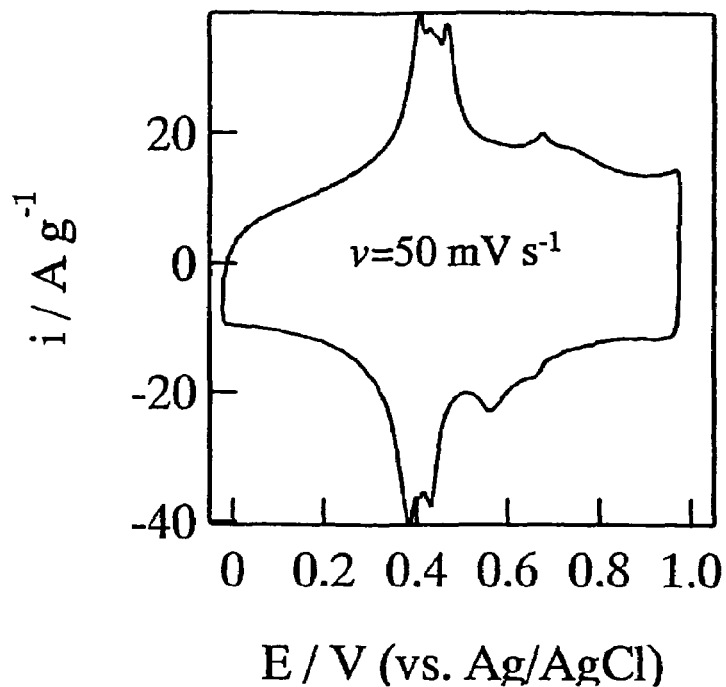
FIG. 20 is a cyclic voltammogram of the HRO/GC electrode of the present invention at a scan rate of 50 mV/s.
Figure 21:
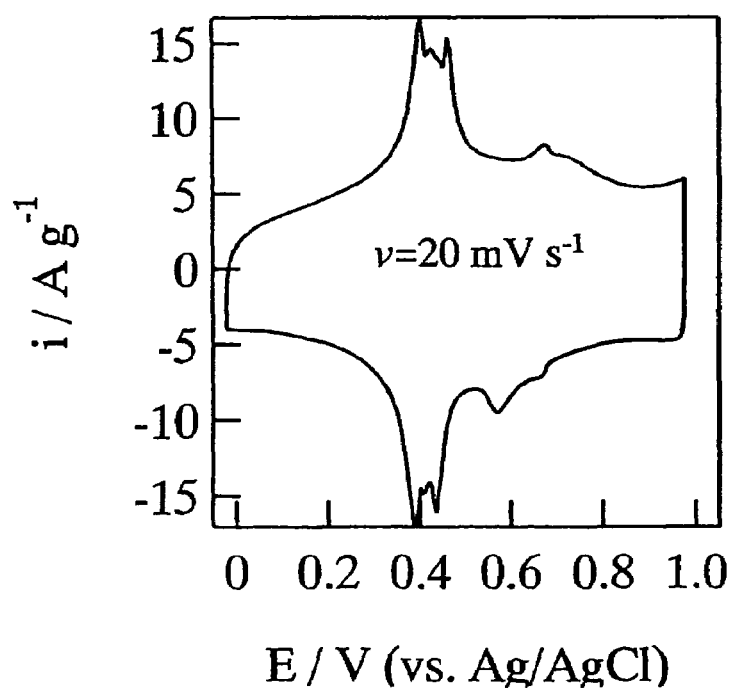
FIG. 21 is a cyclic voltammogram of the HRO/GC electrode of the present invention at a scan rate of 20 mV/s.
Figure 22:
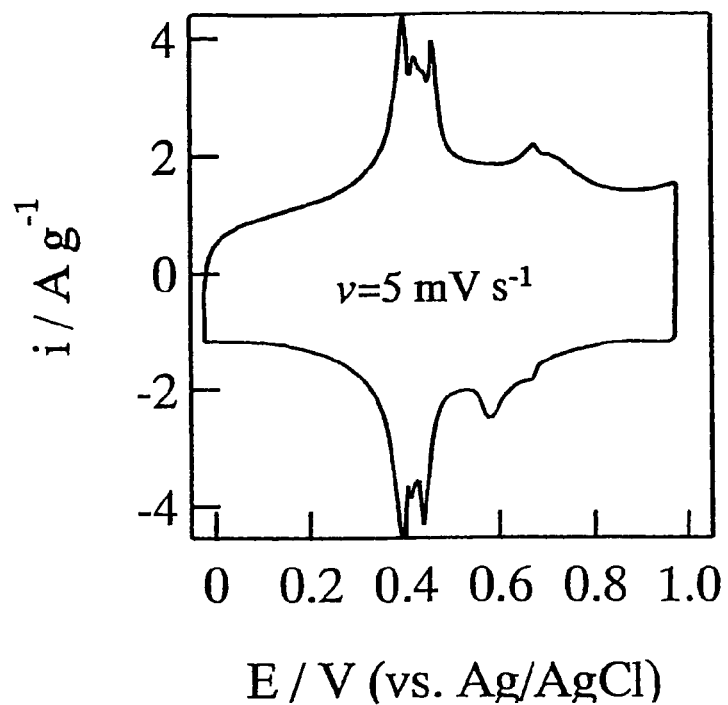
FIG. 22 is a cyclic voltammogram of the HRO/GC electrode of the present invention at a scan rate of 5 mV/s.
Figure 23:
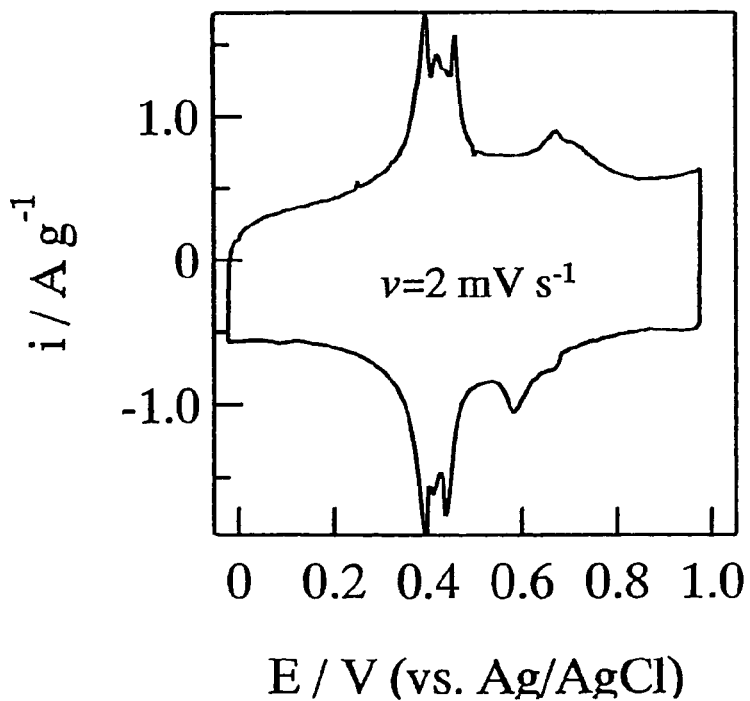
FIG. 23 is a cyclic voltammogram of the HRO/GC electrode of the present invention at a scan rate of 2 mV/s.

A dispersion (colloid) containing the ruthenic acid nanosheets obtained in the above step (d) was casted on a glass substrate. Thereby, the ruthenic acid nanosheets constituted a layered structure again to form an oriented thin film made of a layered tetrabutylammonium-ruthenic acid intercalation compound. FIG. 17 shows a powder X-ray diffraction pattern of the oriented thin film. FIG. 17 indicates that the oriented thin film has a layered structure having the basal interplanar spacing $d_{001}$ of 1.68 nm and excellent c-axis orientation. Table 7 shows the diffraction peak indexing of the oriented thin film.

TABLE 7

XRD peak indexing of oriented thin film obtained by casting colloidal ruthenic acid nanosheet on glass substrate ($3 \leq 2\theta(CuK\alpha) \leq 60$)

| 2θ/° (CuKα) | d/nm | h | k | l | Peak intensity |
|---|---|---|---|---|---|
| 5.22 | 1.693 | 0 | 0 | 1 | 100 |
| 10.46 | 0.846 | 0 | 0 | 2 | 30 |
| 15.82 | 0.560 | 0 | 0 | 3 | 15 |
| 21.22 | 0.419 | 0 | 0 | 4 | 9 |
| 26.66 | 0.334 | 0 | 0 | 5 | 3 |
| 32.16 | 0.278 | 0 | 0 | 6 | 1 |
| 37.76 | 0.238 | 0 | 0 | 7 | 1 |
| 43.56 | 0.208 | 0 | 0 | 8 | <1 |
| 49.04 | 0.186 | 0 | 0 | 9 | <1 |

Example 2

In this example, the protonic layered ruthenic acid hydrate (HRO=$H_{0.22}RuO_{2.11} \cdot nH_2O$, n>0) obtained in the above step (b) was used to fabricate an electrode for an electrochemical supercapacitor. Then, the capacitance thereof was measured.

The protonic layered ruthenic acid hydrate was dispersed in a solvent such as water or dimethylformamide (about 40 μg/L) and the resulting dispersion was dropped on a cross-sectional surface of a glassy carbon rod (5 mm in diameter). Further, a perfluorocarboxylic acid ionomer (sold under the trade name Nafion by DuPont) was dropped thereon as a fixing agent and then dried to obtain an electrode made of the protonic layered ruthenic acid hydrate supported on the glassy carbon (hereinafter abbreviated as HRO/GC).

The HRO/GC electrode, a counter electrode of platinum mesh and an Ag/AgCl reference electrode were placed in an electrolyte of 0.5 M sulfuric acid and scanning was performed at a scan rate of 500 to 2 mV/s to obtain cyclic voltammograms (CV). FIGS. 18-23 are CVs obtained at the scan rates of 500 mV/s, 200 mV/s, 50 mV/s, 20 mV/s, 5 mV/s and 2 mV/s, respectively.

When the scanning was performed at a high rate, a square-like CV was obtained, which is a unique feature of the pseudo electrical double-layer capacitor. When the scan rate was low, a redox capacitance resulted from the oxidation-reduction reaction was obtained in addition to a pseudo electrical double-layer capacitance. The capacitance derived from the pseudo electrical double-layer capacitor was hardly dependent on the scan rate, while the redox capacitance increased with a decrease in scan rate.

Table 8 shows the capacitances of the HRO/GC electrode calculated from the CVs obtained at various scan rates. The capacitance slightly increased with a decrease in scan rate, which was caused by the above-mentioned increase of the redox capacitance. The obtained capacitance was similar to that of hydrous $RuO_2$ synthesized by electrolytic oxidation and an order of magnitude larger than that of rutile-type $RuO_2$.

Provided that the pseudo electrical double-layer capacitance of $RuO_2$ (independent of the oxidation-reduction reaction) is about 80 μF/cm² (microfarad per effective surface area), an active surface area was calculated as 486 m²/g from the capacitance at 50 mV/s (389 F/g). An effective surface area of conventional rutile-type $RuO_2$ is 50 to 60 m²/g even in a fine particle having a particle diameter of 10 nm (BET specific surface area obtained by $N_2$ adsorption/desorption measurements).

TABLE 8

| Scan rate (mV/s) | Capacitance (F/g-RuO$_2$) | Electrochemical activity area(m$^2$/g-RuO$_2$) | Energy density (kJ/kg-RuO$_2$) | Energy density (Wh/kg-RuO$_2$) |
|---|---|---|---|---|
| 2 | 352 | 508 | 51 | 14 |
| 5 | 347 | 503 | 50 | 14 |
| 20 | 337 | 494 | 49 | 14 |
| 50 | 330 | 486 | 49 | 14 |
| 200 | 319 | 470 | 47 | 13 |
| 500 | 301 | 458 | 46 | 13 |

The protonic layered ruthenic acid hydrate has different characteristics from those of existing amorphous hydrous RuO$_2$ and rutile-type RuO$_2$. The characteristics are listed below.

(i) The protonic layered ruthenic acid hydrate is extremely large in electrochemically active surface area. Each of the layers in the protonic layered ruthenic acid hydrate has a thickness of 1 nm or smaller and protons or hydrated protons can move freely between the layers. The electrochemically active specific surface area is as large as 508 m$^2$/g-RuO$_2$.

(ii) In the form of HRO/GC, a clear redox couple is observed when the charge/discharge is slow (the scan rate is low or the charge/discharge is performed at a small current). This component is dependent on a crystalline structure and cannot be obtained in the amorphous hydrous RuO$_2$. The redox capacitance depends on the active surface area. In rutile-type RuO$_2$, the redox capacitance is solely obtained on the particle surface, and therefore the capacitance obtained as a whole is extremely small. The active surface area of the rutile-type RuO$_2$ is 50 m$^2$/g, whereas that of the protonic layered ruthenic acid is 508 m$^2$/g-RuO$_2$, which is almost 10 times larger than that of the rutile-type RuO$_2$. In the protonic layered ruthenic acid, the interlayer space itself is electrochemically active. Therefore, the redox capacitance that cannot be achieved in the rutile-type RuO$_2$ is obtained.

(iii) In the HRO/GC, a certain capacitance is obtained even if the charge/discharge is extremely fast (the scan rate is high or the charge/discharge is performed at a large current). This capacitance includes a non-faradaic electrical double-layer capacitance component and a faradaic redox capacitance component. These capacitance components are dependent on the electrochemically active surface area. In the rutile-type RuO$_2$, these components are less contributory to the whole capacitance because they are obtained solely on the particle surface. The active surface area of the rutile-type RuO$_2$ is 50 m$^2$/g, whereas that of the protonic layered ruthenic acid is 508 m$^2$/g-RuO$_2$, which is almost 10 times larger than the above. Since the interlayer space in the protonic layered ruthenic acid is electrochemically active, a pseudo capacitance that cannot be achieved in the rutile-type RuO$_2$ is obtained.

On the whole, the protonic layered ruthenic acid allowed the electrolyte to permeate into the space between the crystalline RuO$_2$ layers, giving proton conductivity without deteriorating the electron conductive network. Further, the thickness of the RuO$_2$ layers was reduced to as small as 0.5 nm or smaller, thereby attaining an active surface area as extremely large as 508 m2/g.

As a result, the non-faradaic electrical double-layer capacitance component independent of the redox reaction and the faradaic redox capacitance are obtained at very rapid speed, thereby a large capacitance is obtained even when the charge/discharge is performed at a large current. Moreover, since a redox capacitance derived from the crystalline structure is also obtained on the layer surface, a larger capacitance is obtained when the charge/discharge is performed at a low rate. Thus, the protonic layered ruthenic acid hydrate is a large-capacitance electrochemical supercapacitor material capable of rapid charging/discharging and exhibits extremely high energy density and power density.

It is assumed that such high energy density and high power density are ascribable to excellent mixed proton/electron conductivity of the protonic layered ruthenic acid hydrate. In general, whether the mixed proton/electron conductivity is good or not can be judged on the analogy of i-V curve (CV). As the grounds for the above assumption, the i-V curve shows favorable rise even at a high scan rate, keeping the square form similar to that of a capacitor. Further, no resistance is observed in the curve. It is also understood from the numeric data shown in Tables 8 and 10, in which capacitance loss is hardly observed.

For example, regarding the capacitance at 2 mV/s as 100%, the capacitance maintenance ratio of the protonic layered ruthenic acid at 500 mV/S is 90%. On the other hand, rutile-type RuO$_2$ nanoparticles having a particle diameter in the nanometer order show the capacitance maintenance ratio as low as 69% at 500 mV/s. This suggests that the proton conductivity is maintained to a sufficient degree. Table 9 shows the data.

TABLE 9

| | Layered HRO | | Rutile-type RuO$_2$ nanoparticle | |
|---|---|---|---|---|
| Scan rate (mV/s) | Capacitance (F/g-RuO$_2$) | Capacitance maintenance ratio (%) | Capacitance (F/g-RuO$_2$) | Capacitance maintenance ratio (%) |
| 2 | 407 | 100 | 60 | 100 |
| 5 | 402 | 99 | 55 | 92 |
| 20 | 395 | 97 | 50 | 83 |
| 50 | 389 | 96 | 47 | 78 |
| 200 | 376 | 92 | 43 | 72 |
| 500 | 366 | 90 | 42 | 69 |

Example 3

In Example 2 above, the capacitance of the protonic layered ruthenic acid hydrate in sulfuric acid was explained. In the present invention, however, a hydrated layered potassium ruthenate and various alkaline electrolytes are also applicable.

(1) The protonic layered ruthenic acid hydrate was synthesized in the same manner as Example 2 and the capacitance thereof in an alkaline electrolyte was measured in the same manner as Example 2 except that the 0.5 M sulfuric acid electrolyte was replaced with a 1 M KOH electrolyte. Table 10 shows the results. The obtained capacitance was 5 times larger than the rutile-type RuO$_2$ nanoparticles having a particle diameter in the nanometer order. The fact that the capacitance is smaller than that obtained with use of the 0.5 M sulfuric acid electrolyte is derived from a decrease in pseudo-capacitance due to oxidation-reduction in the alkaline electrolyte.

TABLE 10

| Scan rate (mV/s) | Capacitance (F/g-$RuO_2$) | |
|---|---|---|
| | Layered HRO | Rutile-type $RuO_2$ nanoparticle |
| 2 | 268 | 51 |
| 5 | 257 | 46 |
| 20 | 233 | 41 |
| 50 | 212 | 38 |
| 200 | 181 | 34 |
| 500 | 156 | 32 |

(2) A hydrated layered potassium ruthenate and a dispersion of polyethylene terephthalate (PTFE) as a binder (30-J manufactured by DuPont Mitsui Fluorochemical Co., Ltd.) were mixed and the resulting mixture was applied to a current collector to form a film electrode. Table 11 shows the capacitance obtained in the 0.5 sulfuric acid electrolyte and the 1 M KOH electrolyte. The obtained capacitance was 6 times larger at the maximum than that of the rutile-type $RuO_2$ nanoparticles.

TABLE 11

| Scan rate (mV/s) | Capacitance (F/g-$RuO_2$) | | |
|---|---|---|---|
| | Layered HRO | | Rutile-type $RuO_2$ nanoparticle |
| | 0.5M $H_2SO_4$ | 1M KOH | 0.5M $H_2SO_4$ |
| 2 | 339 | 262 | 68 |
| 5 | 326 | 247 | 59 |
| 20 | 296 | 213 | 48 |
| 50 | 253 | 176 | 39 |

Example 4

In this example, an explanation is given of how to use a layered ruthenic acid compound according to the present invention to form an electrochemical device. The layered ruthenic acid compound has an extremely stable crystalline structure as understood from the SEM image and the X-ray diffraction pattern. Hereinafter, steps of manufacturing the electrochemical device are described.

(a) Pulverizing Step

A layered ruthenic acid compound was pulverized roughly and then finely, followed by classification into particles having a particle diameter of 8 to 2.5 μm.

(b) Mixing/kneading Step

Then, were mixed 40 parts by weight of the classified layered ruthenic acid compound, 50 parts by weight of activated carbon powder (BP-20 manufactured by KURARAY CHEMICAL, average particle diameter: 5 μm, specific surface area: 2200 m²/g, average pore diameter: 16 Å), 4 parts by weight of a conductive material, 2 parts by weight of a primary binder, 2 parts by weight of a permanent binder and 2 parts by weight of a rubber material. The mixture was subjected to dry blending, wet blending and kneading to prepare an electrode material.

(c) Particulars of Electrode Materials

The conductive material used was a carbon black mixture of acetylene black and ketchen black in the mixing ratio of 1:1 by weight. The primary binder used was a mixture of starch and carboxymethyl cellulose in the mixing ratio of 1:1 by weight. The permanent binder used was a sol of polytetrafluoroethylene (PTFE) when an aqueous solvent was used, or a sol of polyvinylidene fluoride (PVDF) when an organic solvent was used.

As the rubber material, a mixture of acrylonitrile-butadiene rubber (NBR) and styrene-butadiene rubber (SBR) in the mixing ratio of 1:1 by weight was preferably used. As the activated carbon powder, usable were coconut shell activated carbon, phenol-based activated carbon, coal pitch-based activated carbon, petroleum pitch-based activated carbon and aerogel carbon.

(d) Shaping and Drying Steps

Depending on the shape and size of the intended electrochemical device, a press or a coater was used. The electrode material was dried at 100° C. or lower when an organic solvent was used. When an aqueous solvent was used, water content was removed from the electrode material and the primary binder was burned away. Then, the electrode material was dried completely to the falling rate-of-drying stage. Then, the dried electrode was rolled into a sheet of about 120 μm thick using a roller and cut into a desired shape to obtain a sheet electrode.

In the case of forming a coin-shaped capacitor, a pair of sheet electrodes were stacked with a separator (polyvinyl alcohol-based synthetic paper of 50 μm thick, manufactured by Nippon Kokan) interposed therebetween. To form a cylindrical capacitor, a pair of sheet electrodes sandwiching a separator therebetween were wound in a spiral fashion.

(e) Housing

The above-mentioned coin-shaped and cylindrical capacitors were housed into coin-shaped and cylindrical cases together with an electrolyte, respectively. Thus, electrochemical devices were completed.

(f) Evaluations

Charge/discharge characteristics of the obtained electrochemical devices were evaluated. The evaluations were performed at a discharge rate determined in view of actual use and a temperature of 85° C., 45° C., 25° C., 0° C. or −20° C.

An electrochemical device using a conventional ruthenium compound contains $RuO_2$. However, due to its high price, the $RuO_2$ is in a thin film form and dispersed in an island pattern. Accordingly, even though the initial performance is excellent, the obtained electrochemical device causes exfoliation of $RuO_2$ from the activated carbon through repeated charge/discharge. Therefore, the conventional electrochemical device has not been put into practical use. On the other hand, the layered ruthenic acid compound according to the present invention showed excellent crystallinity, which realized stable charge/discharge characteristics during long-term operation.

Example 5

In this example, a layered alkylammonium-ruthenic acid intercalation compound was used to form an electrode for an electrochemical supercapacitor and the capacitance thereof was evaluated.

An electrode was formed in the same manner as Example 2 except that the protonic layered ruthenic acid hydrate was replaced with a layered alkylammonium-ruthenic acid intercalation compound. Then, using a 0.5 M sulfuric acid electrolyte, the capacitance thereof was obtained. Table 12 shows the results. The obtained capacitance was 2 times larger than that obtained with use of the protonic layered ruthenic acid hydrate.

The reason why the capacitance of the layered alkylammonium-ruthenic acid intercalation compound was larger than that of the protonic layered ruthenic acid hydrate is that spacing between the layers was enlarged by alkylammonium and the permeation of the electrolyte was promoted by the enlarged spacing even after the exchange of ions and protons in the electrolyte.

TABLE 12

| Scan rate (mV/s) | Capacitance (F/g-$RuO_2$) | Electrochemical Activity area ($m^2$/g-$RuO_2$) | Energy density (kJ/kg-$RuO_2$) | Energy density (Wh/kg-$RuO_2$) |
|---|---|---|---|---|
| 2 | 355 | 573 | 57 | 16 |
| 5 | 387 | 559 | 56 | 15 |
| 20 | 418 | 538 | 54 | 15 |
| 50 | 430 | 523 | 52 | 14 |
| 200 | 447 | 484 | 48 | 13 |
| 500 | 458 | 444 | 44 | 12 |

Example 6

In this example, a colloid containing ruthenic acid nanosheets (a colloidal ruthenic acid nanosheet) was used to from an electrode for an electrochemical supercapacitor and the capacitance thereof was evaluated.

A layered tetrabutylammonium-ruthenic acid intercalation compound obtained in the same manner as Example 1 was dispersed in methanol used as a high dielectric solvent to obtain a colloid containing ruthenic acid nanosheets. Each of the nanosheets in the colloid was isolated while maintaining its crystal structure. In this colloid, the ruthenic acid nanosheets were dispersed in a stable state, showing a property similar to that of swelling clay.

Figure 24:
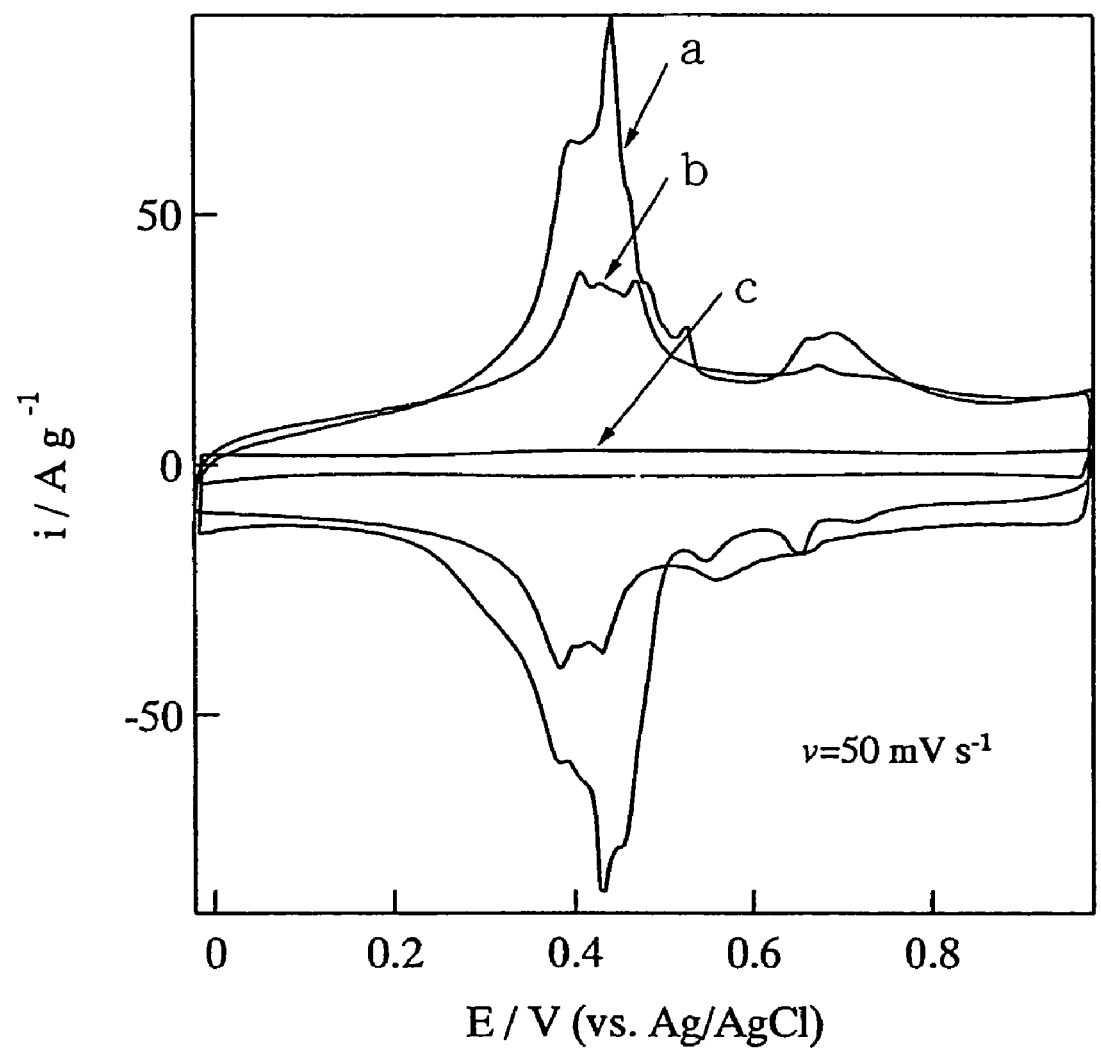
FIG. 24 is a cyclic voltammogram of a nanosheet-modified electrode of the present invention at a scan rate of 50 mV/s.

The colloid solution containing the ruthenic acid nanosheets was applied to the surface of a glassy carbon rod to form an electrode modified with the ruthenic acid nanosheet (nanosheet-modified electrode). More specifically, the colloid solution containing the ruthenic acid nanosheets was dropped and dried on the surface of the glassy carbon rod, and then a perfluorocarboxylic acid ionomer was dropped thereon and dried. The obtained nanosheet-modified electrode was subjected to scanning at 50 mV/s under the same conditions described in Example 2 to obtain a cyclic voltammogram (CV), which is indicated by a in FIG. 24. FIG. 24 also shows comparative CVs b and c of normal HRO (protonic layered ruthenic acid hydrate) particles and rutile-type $RuO_2$ nanoparticles, both of which were not in the nanosheet form.

The CV curve of the nanosheet-modified electrode is essentially similar to that obtained with use of the layered ruthenic acid hydrate. However, in the former one, a redox capacitance component derived from oxidation-reduction reaction is clearly observed even at a high scan rate, which means that the oxidation-reduction reaction becomes more contributory to the whole capacitance. In the nanosheet-modified electrode, it is assumed that the ruthenic acid nanosheets did not form a regularly-ordered layered structure, decreasing diffusion resistance of protons and allowing smoother permeation of the electrolyte into the space between the layers. For these reasons, as seen in Table 13, use of the ruthenic acid nanosheet allows to obtain favorable supercapacitor characteristics even under charge/discharge at a high rate. Hence, the ruthenic acid nanosheet is more suitable for applications requiring high power and high energy than a layered ruthenic acid.

TABLE 13

| Scan rate (mV/s) | Capacitance (F/g-$RuO_2$) | Electrochemical Activity area ($m^2$/g-$RuO_2$) | Energy density (kJ/kg-$RuO_2$) | Energy density (Wh/kg-$RuO_2$) |
|---|---|---|---|---|
| 0.33 | 695 | 869 | 87 | 24 |
| 0.5 | 687 | 859 | 86 | 24 |
| 2 | 658 | 822 | 82 | 23 |
| 5 | 642 | 802 | 80 | 22 |
| 20 | 613 | 766 | 77 | 21 |
| 50 | 601 | 751 | 75 | 21 |
| 200 | 573 | 716 | 72 | 20 |
| 500 | 537 | 671 | 67 | 19 |

Example 7

In this example, various capacitors were compared. A commercially available electrical double-layer capacitor using an electrode made of activated carbon, an electrochemical capacitor using rutile-type $RuO_2$ and typical electrochemical capacitors I and II of the present invention were used to form coin-shaped cells of 20 mm in diameter and 1.6 mm in thickness, respectively. Then, the capacitances per unit mass and unit volume were measured. Table 14 shows the measurement results. Aqueous electrolytes usable were acid electrolytes such as sulfuric acid, hydrochloric acid and perchloric acid, as well as alkaline electrolytes such as KOH, NaOH and LiOH. In this example, 8 N KOH aqueous solution was used.

Capacitors I and II were formed in the same manner as Example 4. As seen in Table 14, the capacitors of the present invention showed the capacitance per unit mass 8 to 11 times as large as that of the rutile-type capacitor and 2 to 3 times as large as that of the electrical double-layer capacitor. Further, the capacitance per unit volume was 5 to 8 times larger than that of the rutile-type capacitor and 9 to 12 times larger than that of the electrical double-layer capacitor.

TABLE 14

| | Electrolyte | $m^2$/g | F/g | F/cc |
|---|---|---|---|---|
| Activated carbon electrode | Organic | 1800–2200 | 35–42 | 16–22 |
| Rutile-type electrochemical capacitor | Aqueous | 50–80 | 12 | 30 |
| Capacitor I | Aqueous | 350 | 94 | 150 |
| Capacitor II | Aqueous | 400 | 140 | 250 |

Example 8

In this example, a catalyst for an electrode of a fuel cell using a ruthenic acid nanosheet was formed and a carbon monoxide (CO) oxidation property and a methanol oxidation property thereof were evaluated.

To a colloidal ruthenic acid solution prepared in the same manner as Example 6, a platinum-based catalyst (carbon-supported platinum) was added, followed by drying to prepare a ruthenic acid nanosheet-modified catalyst (hereinafter abbreviated as HRO-NS/Pt/C). Using the thus prepared catalyst, a glassy carbon rod functioning as a current collector was modified in the same manner as Example 6 to form an electrode. Further, a carbon-supported platinum (Pt/C) catalyst was used to form a comparative electrode.

In the presence of 1 M methanol, a methanol oxidizing current in 0.5 M sulfuric acid at 0.5 V (vs. RHE) was measured after 30 minutes. As a result, the HRO-NS/Pt/C showed higher current density than the Pt/C. More specifically, the HRO-NS/Pt/C showed 21 A/g-Pt, while the Pt/C showed 2 A/g-Pt. It is assumed that the nanosheet-modified catalyst according to the present invention is suitable as a catalyst for a methanol oxidizing electrode and that the HRO-NS functions as a promoter for giving resistance against CO poisoning. As a ground of the assumption, an explanation is given of a difference in electrolytic oxidation of CO adsorbed on HRO-NS/Pt/C ($RuO_2$:Pt=1:1 (molar ratio), Pt:C=30:70 (volume ratio)) and Pt/C (Pt:C=30:70 (volume ratio)) in 0.5 M sulfuric acid electrolyte.

The electrolytic oxidation of CO on the HRO-NS/Pt/C is initiated at about 0.44 V (vs. RHE). Whereas, on the Pt/C, it is initiated at a potential higher than about 0.62V (vs. RHE). It is well known that CO poisons the Pt surface when a methanol fuel or a fuel modified from methanol or city gas is used. Accordingly, if the resistance against CO poisoning is excellent, it means that the catalyst utilization ratio increases. In the case of the HRO-NS/Pt/C, an OH ion for oxidizing the adsorbed CO is on the HRO surface, which allows easy oxidation of CO.

The present invention provides a ruthenic acid nanosheet of 1 nm or smaller in thickness having a crystalline structure and a layered ruthenic acid compound having a layered structure of the nanosheets. The nanosheet and the layered ruthenic acid nanosheet of the present invention are higher in charging capability than conventional ruthenium oxide, and hence they are effectively used as an electrode of an electrochemical device. Further, the nanosheet and the layered ruthenic acid compound according to the present invention can be applied to not only an electrochemical device but also an electrode for a polymer electrolyte fuel cell, a photocatalyst and a dye sensitizing photovoltaic cell.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A layered ruthenic acid intercalation compound comprising a layered structure of ruthenic acid nanosheets, each ruthenic acid nanosheet having a thickness of not more than 1 nm. represented by the formula (1): $[RuO_{2+0.5x}]^{x-}$, wherein $0<x<1$, and alkylammonium, said layered ruthenic acid compound having an X-ray diffraction peak intensity at a (00L) plane (L=1 to n when $0 \leq 0(CuK\alpha) \leq 90°$, n is determined depending on a basal interplanar spacing and $5 \leq n \leq 35$).

2. A method of producing a ruthenic acid nanosheet comprising the steps of:
   (a) mixing ruthenium oxide and an alkali metal compound and sintering or melting the resulting mixture to obtain a layered alkali metal-ruthenate compound containing a ruthenic acid nanosheet having a thickness of not more than 1 nm;
   (b) treating said layered alkali metal-ruthenate compound in an acidic solution to exchange at least part of alkali metal with proton to obtain a protonic layered ruthenic acid hydrate;
   (c) reacting said protonic layered ruthenic acid hydrate with alkylammonium or alkylamine to obtain a layered alkylammonium-ruthenic acid intercalation compound; and
   (d) mixing said layered alkylammonium-ruthenic acid intercalation compound with a solvent to obtain a colloid containing a ruthenic acid nanosheet having a thickness of not more than 1 nm.

3. A method of producing the ruthenic acid nanosheet in accordance with claim 2, wherein ruthenium oxide and alkali metal salt are mixed and the resulting mixture is sintered at 700-900° C. in the step (a).

4. A method of producing the ruthenic acid nanosheet in accordance with claim 2, wherein ruthenium oxide and alkali metal hydroxide are mixed and the resulting mixture is melted at 500-700° C. in the step (a).

5. A method of producing the ruthenic acid nanosheet in accordance with claim 2, wherein said protonic layered ruthenic acid hydrate is reacted with alkylammonium represented by $(R)_m NH_{4-m}$ or $(R)_{m-p}(R')_p NH_{4-m}$ (where R and R' are $CH_3(CH_2)_q$, respectively, m=0 to 4, p=0 to 3 and q=0 to 18) in the step (c).

6. A method of producing the ruthenic acid nanosheet in accordance with claim 2, wherein said protonic layered ruthenic acid hydrate is reacted with alkylamine represented by $(R)_m NH_{3-m}$ or $(R)_{m-p}(R')_p NH_{3-m}$ (where R and R' are $CH_3(CH_2)_q$, respectively, m=0 to 3, p=0 to 2 and q=0 to 18) in the step (c).

7. A method of producing the ruthenic acid nanosheet in accordance with claim 2, wherein said layered alkylammonium-ruthenic acid intercalation compound is mixed with at least one solvent selected from the group consisting of water, alcohol, acetonitrile, dimethyl sulfoxide, dimethylformamide and propylene carbonate to obtain a colloid in the step (d).

* * * * *